US009128447B2

(12) United States Patent
Takahashi

(10) Patent No.: US 9,128,447 B2
(45) Date of Patent: Sep. 8, 2015

(54) IMAGE FORMING APPARATUS AND IMAGE FORMING APPARATUS CONTROL METHOD

(75) Inventor: Tomohiro Takahashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 1065 days.

(21) Appl. No.: 12/818,612

(22) Filed: Jun. 18, 2010

(65) Prior Publication Data

US 2010/0328718 A1 Dec. 30, 2010

(30) Foreign Application Priority Data

Jun. 24, 2009 (JP) ................................ 2009-150028

(51) Int. Cl.
*G06F 3/12* (2006.01)
*H04N 1/04* (2006.01)
*G03G 15/00* (2006.01)

(52) U.S. Cl.
CPC ................................. *G03G 15/6564* (2013.01)

(58) Field of Classification Search
CPC ................................... G06F 3/12; H04N 1/04
USPC .......................................... 358/1.15; 399/396
See application file for complete search history.

(56) References Cited

U.S. PATENT DOCUMENTS

| | | | | |
|---|---|---|---|---|
| 6,014,542 A * | 1/2000 | Hozumi et al. | ............... | 399/394 |
| 2004/0223797 A1* | 11/2004 | Ueda | ............................. | 399/388 |
| 2006/0268093 A1* | 11/2006 | Kobayashi | .................... | 347/116 |

FOREIGN PATENT DOCUMENTS

| | | |
|---|---|---|
| JP | 2004-13039 | 1/2004 |
| JP | 2004013039 A * | 1/2004 |
| JP | 2004-354983 | 12/2004 |
| JP | 2005-17533 | 1/2005 |
| JP | 2005017533 A * | 1/2005 |
| JP | 2006-337472 | 12/2006 |

OTHER PUBLICATIONS

English tranlsation of JP2005017533A provided by JPO machine translation service on Jan. 19, 2014.*

* cited by examiner

*Primary Examiner* — Thomas D Lee
(74) *Attorney, Agent, or Firm* — Smith, Gambrell & Russell LLP.

(57) ABSTRACT

An image forming apparatus according to the present invention includes: a paper feed part; a conveying path conveying paper from the paper feed part; a transfer part transferring an image onto the paper; a registration roller timely delivering the paper to the transfer part; a paper detector detecting paper arrival at the registration roller; an image forming part starting image formation; an image processing part transmitting to the image forming part image data used for the image formation; and a control part, based on output of the paper detector, in a case where the paper detector has not detected the paper arrival at a check time point provided before a tip of the image arrives at the transfer part after the start of the image formation, delaying an image formation speed at the image forming part and an image data transmission speed of the image processing part.

6 Claims, 11 Drawing Sheets

IMAGE FORMING APPARATUS AND IMAGE FORMING APPARATUS CONTROL METHOD

This application is based upon and claims the benefit of priority from the corresponding Japanese Patent Application No. 2009-150028 filed on Jun. 24, 2009, the entire contents of which are incorporated herein by reference.

BACKGROUND OF THE INVENTION

1. Field of the Invention

The present invention relates to an image forming apparatus such as a copier, a multi-function printer, a printer, or the like that performs printing by previously forming images on image carriers and then transferring the formed images onto paper.

2. Description of Related Art

Typically, some of image forming apparatuses such as copiers, multi-function printers, and printers previously form an image (for example, toner image) on an image carrier. In such image forming apparatuses, for the purpose of synchronizing image delivery to a transfer part performing image transfer with paper arrival, a registration roller is provided. The registration roller timely enters paper into the transfer part, whereby the image is accurately and appropriately transferred onto the paper from a transfer start position of the paper. However, due to factors such as a shift of a paper loading position at a paper storing portion, a change in a conveyance distance as a result of switching a paper cassette during continuous printing, slipping at a paper feed roller performing paper feeding and/or at a conveyance roller performing paper conveyance, paper arrival at the transfer part and the registration roller may be delayed.

With the delay in the paper arrival, the image is transferred onto the paper in a displaced manner, for example, the transfer onto the paper starts from the middle of the image. As a result, there arises a case where the image is cut on the middle of the page or a case where a problem with image quality arises. Such cases require reprinting.

Thus, known is an image forming apparatus including: an image carrier; an image formation means adapted to form an image on the image carrier; a conveyance means adapted to convey recording paper; a conveyance control means adapted to stop the conveyance means to temporarily stop the recording paper and redriving the conveyance means at timing at which the image formed on the image carrier is transferred at a predetermined position of the recording paper; a timer means adapted to measure time from when the conveyance of the recording paper is stopped by the conveyance control means to when the conveyance is started again; a calculation means adapted to compare the time measured by the timer means with reference time and then based on a time difference therebetween, calculate lag time; and an adjustment means adapted to, for recording paper on which image transfer is performed following the aforementioned recording paper, cancel the lag time calculated by the calculation means and then control the conveyance means in a manner such that a period during which the recording paper is stopped is brought closer to the reference time. With this configuration, in a case where a delay in paper feed occurs due to, for example, slipping at a roller for conveying the recording paper, the adjustment means brings start of the recording paper conveyance forward by time corresponds to the lag time.

Typically, the registration roller is provided upstream of the transfer part in a paper conveyance direction. The paper is temporarily stopped by the registration roller. The temporary stopping of the paper is done for the purpose of the timely entrance into the transfer part, correcting paper skew, etc. To correct the skew, the conveyance is continued on a paper back end side to bend the paper. Then utilizing elastic properties of the bent paper, a paper leading end is placed along the registration roller to correct the skew.

On the other hand, with the delay in the paper arrival at the transfer part and the registration roller, the image cannot be transferred from a planned transfer start position of the paper and thus displaced. The more the amount of its displacement is, the more likely reprinting is to be required. Moreover, with the delay in the paper arrival, the image may arrive at the transfer part earlier, with part thereof transferred onto a component inside the transfer part, which may stain later-arriving paper. Thus, typically, a period during which the paper is stopped at the registration roller is reduced to make up for the delay in the paper arrival.

However, even when the period during which the paper is stopped at the registration roller is reduced to zero, the earlier the image arrives at the transfer part, the greater the delay in the paper arrival at the registration roller may be. That is, there is a problem of limitations on coping with the delay in the paper arrival by reducing the period during which the paper is stopped at the registration roller. In such a case, in order to prevent waste of paper, toner adhesion to the transfer part, etc., a temporarily-formed image is disposed and the same image is formed again. However, the image disposal presents a problem that the already formed image is wasted and also longer time is required for printing.

The well-known image forming apparatus described above, in a case where the delay in the paper arrival at the registration roller and the transfer part occurs constantly, is very effective in terms of resolving the delay. However, a delay in the paper arrival to a degree over a time point (limit) that permits transfer without any displacement from the transfer start position of the paper may require the image disposal. Therefore, there are some cases where the problem of limitation on coping with the delay in the paper arrival by reducing the period during which the paper is stopped at the registration roller cannot be coped with.

SUMMARY OF THE INVENTION

In view of the problem described above, it is an object of the present invention to, in a case where there is a possibility of a delay in paper arrival resulting in failure to perform transfer without any displacement from a transfer start position of paper, delay an image formation speed and an image data transmission speed to delay image arrival at a transfer part to thereby achieve transfer performed without any displacement, thus avoiding disposal of a temporarily-formed image due to the delay in the paper arrival and thereby reducing waste of the image.

In order to achieve the object described above, an image forming apparatus according to one aspect of the invention includes: a paper feed part supplying paper used for printing; a conveying path conveying the paper supplied from the paper feed part; a transfer part transferring an image onto the paper; a registration roller provided on the conveying path upstream of the transfer part in a paper conveyance direction, temporarily stopping the paper, and then timely delivering the paper to the transfer part in a manner such that the transfer is performed without any image displacement from a transfer start position of the paper; a paper detector provided upstream of the registration roller in the paper conveyance direction and detecting paper arrival at the registration roller; an image forming part forming on an image carrier the image to be transferred onto the paper at the transfer part and starting image formation before the detection of the paper arrival by the paper detector; an image processing part transmitting to the image forming part image data used for the image formation; and a control part controlling operation of the apparatus to control the printing, based on output of the paper detector, recognizing that the paper has arrived at the paper detector, and in a case where the paper detector has not detected paper arrival at a check time point provided before a tip of the image arrives at the transfer part after the start of the image formation, delaying an image formation speed at the image forming part and an image data transmission speed of the image processing part.

According to this aspect, in a case where the paper arrival has not been detected at the check time point, the image formation speed and the image data transmission speed are delayed. Therefore, time of image arrival at the transfer part is delayed more than that in a case where the image formation is performed at a normal speed. That is, in accordance with the delay in the paper arrival, the image arrival at the transfer part is delayed, so that the image can be transferred without any displacement from the transfer start position of the paper. Moreover, the temporarily-formed image does not have to be disposed due to the delay in the paper arrival, avoiding unnecessary consumption of an image-forming material (for example, toner). Moreover, compared to a case where the image formation is performed again, overall time required for printing is shorter.

Further features and advantages of the invention will be more clarified by embodiments described below.

DETAILED DESCRIPTION OF PREFERRED EMBODIMENTS

Hereinafter, with reference to FIGS. 1 to 7, a first embodiment of the present invention will be described, referring to as an example a color multi-function printer 100 (corresponding to image forming apparatus) of a xerographic, tandem type. Note that factors such as configuration and arrangement described in this embodiment do not limit the scope of the invention and thus just serve as illustrative examples.

(Outline of the Multi-function Printer 100)

Figure 1:
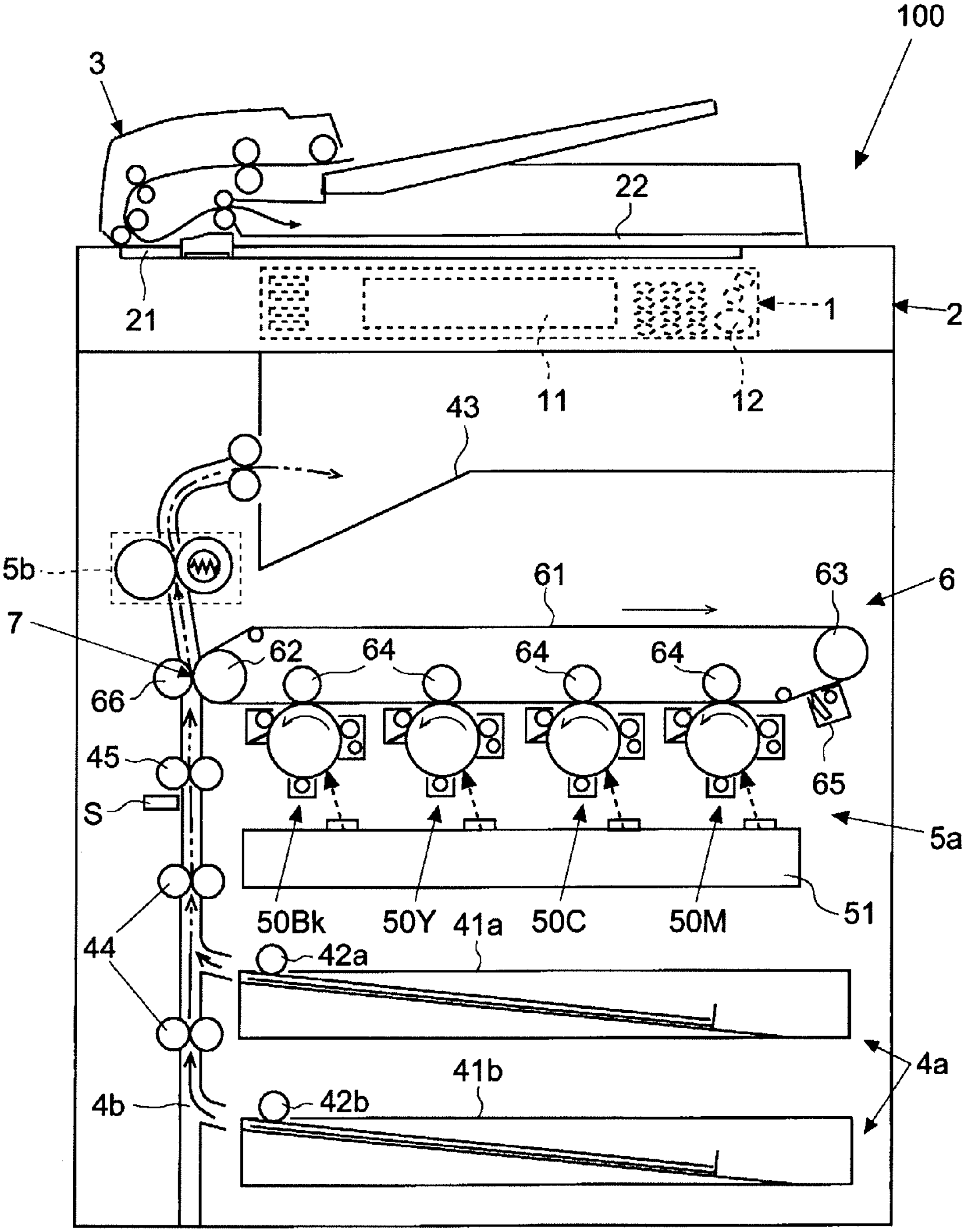
FIG. 1 is a schematic elevation sectional view of a multi-function printer according to a first embodiment of the present invention.

First, based on FIG. 1, outline of the multi-function printer 100 will be described. FIG. 1 is a schematic elevation sectional view of the multi-function printer 100 according to the first embodiment of the invention.

As shown in FIG. 1, arranged at the front of the multi-function printer 100 in an elevation view is an operation panel 1 for operation setup of the multi-function printer 100 (to be described in detail later). Moreover, provided on the top of the multi-function printer 100 are: an image reading part 2 reading an image of a document; and a document conveying device 3. Arranged inside the multi-function printer 100 are: a paper feed part 4*a*, a conveying path 4*b*, an image forming part 5*a* (to be described in detail later), an intermediate transfer mechanism 6, a fixing part 5*b*, etc.

First, the document conveying device 3 automatically and continuously conveys documents to be read at the image reading part 2 in such a manner that the documents make contact with a document-delivered reading contact glass 21 on a top surface of the image reading part 2. Moreover, the document conveying device 3 can be lifted upward by a support point (not shown) provided on a rear side of a paper surface. For example, documents such as a book are loaded on a document-loaded reading contact glass 22 on the top surface of the image reading part 2.

Next, the image reading part 2 is unitized as a scanner, and irradiates the document with light and reads the document based on reflection light thereof to thereby generate image data. For example, the image reading part 2 incorporates: moving frames provided with a lamp for irradiating the document with light and a plurality of mirrors for guiding the refection light of the document to a lens; the lens; an image sensor; etc. The moving frames are moved horizontally as appropriate, and the lamp irradiates light to a document passing above the document-delivered reading contact glass 21 and a document loaded on the document-loaded reading contact glass 22. Then the image sensor receives the incoming reflection light focused by the lens and performs photoelectric conversion in accordance with an amount of the reflection light to generate the image data of the document. Then the multi-function printer 100 can perform printing based on the read image data (has a copy function).

The paper feed part 4*a* stores as recording mediums various types of paper such as plain paper, recycled paper, label paper, OHP paper, and the like (corresponding to paper of different sizes including A4, B4, etc.), and supplies the paper used for printing. The paper feed part 4*a* has cassettes 41 (the upper one is marked with numeral 41*a* and the lower one is marked with numeral 41*b* in FIG. 1). Above the cassettes 41, paper feed rollers 42 (the upper one is marked with numeral 42*a* and the lower one is marked with numeral 42*b* in FIG. 1) driven into rotation upon the paper supply are provided.

The conveying path 4*b* conveys the paper supplied from the paper feed part 4*a* to a discharge tray 43. Provided at the conveying path 4*b* are: in addition to conveyance roller pairs 44 performing paper conveyance, a registration roller pair 45 (corresponding to registration roller), a paper detection sensor S, etc.

The registration roller pair 45 is a rotor provided on the conveying path 4*b* upstream of a transfer part 7 in a paper conveyance direction. The registration roller pair 45 temporarily stops the paper conveyed by the paper feed rollers 42 and the conveyance roller pairs 44. Then the conveyance is continued by the conveyance roller pairs 44 whereby the paper is bent. Consequently, by elasticity provided by the paper bending, a tip of the paper is lifted up in such a manner as to extend along a nip of the registration roller pair 45. Then the registration roller pair 45, in synchronization with transfer of images (toner images) primarily transferred onto an intermediate transfer belt 61, delivers the paper to the transfer part 7 in such a manner that the images are transferred without any image displacement from a transfer start position of the paper.

The paper detection sensor S (corresponding to a paper detector) is provided upstream of the registration roller pair 45 in the paper conveyance direction. The paper detection sensor S is capable of detecting paper arrival at the registration roller pair 45 and paper passage from the registration roller pair 45. For example, the paper detection sensor S is formed of a transmissive or reflective optical sensor. In the multi-function printer 100 of this embodiment, in addition to the paper detection sensor S, a plurality of the same sensors may be further provided along the conveying path 4*b*.

For example, the paper detection sensor S can be formed of a light-tight plate which, with a light receiving part such as a photodiode or the like facing a light emitting part such as an LED or the like, moves between the light emitting part and the light receiving part in a direction parallel to the paper conveyance direction while making contact with the conveyed paper. With this configuration, the conveyed paper moves the light-tight plate, whereby a light-blocked state is released and output (a voltage, a current) of the light receiving part changes. For example, if the output of the light receiving part changes from the light-blocked state to a light-received state, it is detected that the paper has arrived. On the other hand, if the output of the light-receiving part changes from the light-received state to the light-blocked state, it is detected that the paper has passed through the paper detection sensor S. A paper detection sensor S may be used which is provided with a light emitting part and a light receiving part in such a manner as to sandwich conveyed paper therebetween and whose light reception at the light receiving part is blocked upon paper conveyance. Moreover, the paper detection sensor S is only required to detect the presence of the paper, and thus not limited to an optical sensor and may be an ultrasonic sensor or the like.

The intermediate transfer mechanism 6 is a provided above the image forming part 5*a*. The intermediate transfer mechanism 6 is a portion which, based on the image data, accepts primary transfer of images respectively formed on peripheral surfaces of photosensitive drums 52 of the image forming part 5*a* and performs secondary transfer of the images onto the paper. An intermediate transfer belt 61 is stretched over a driving roller 62, a driven roller 63, four primary transfer rollers 64, etc. in such a manner that a lower outer peripheral surface of the intermediate transfer belt 61 abuts against each of the photosensitive drums 52. The driving roller 62 is connected with driving means (not shown) such as a motor, a gear, or the like to be thereby rotated. The intermediate transfer belt 61 is rotated clockwise (in a direction of arrow) in FIG. 1 by the rotation of the driving roller 62.

Here, the primary transfer rollers 64 are arranged opposite to the respective photosensitive drums 52 in such a manner as to be individually rotatable, and a predetermined volume of voltage is applied to each of the primary transfer rollers 64. The images of different colors are primarily transferred from the respective photosensitive drums 52 onto the intermediate transfer belt 61 by the voltage application to each of the primary transfer rollers 64. The images of the different colors are superimposed on each other without any displacement upon this primary transfer. A belt cleaning device 65 removes remaining toner, etc. from the intermediate transfer belt 61 for cleaning.

Provided in the intermediate transfer mechanism 6 is a secondary transfer roller 66 that abuts against the intermediate transfer belt 61, opposes the driving roller 62, and is rotatably supported. A nip portion between this driving roller 62 and the intermediate transfer belt 61 serves as the transfer part 7 for the image transfer onto the paper. That is, the transfer part 7 is provided which transfers onto the paper the images formed in the image forming part 5*a*. When the paper and the images enter into the transfer part 7, a predetermined voltage is applied to the secondary transfer roller 66, whereby the images are secondarily transferred onto the paper. The fixing part 5*b* fixes the images transferred onto the paper. The paper is pressurized and heated upon passage through the fixing part 5*b*, whereby the images are fixed onto the paper. Then the paper is discharged to the discharge tray 43, thereby completing printing.

(Configuration of the Image Forming Part 5*a*)

Figure 2:
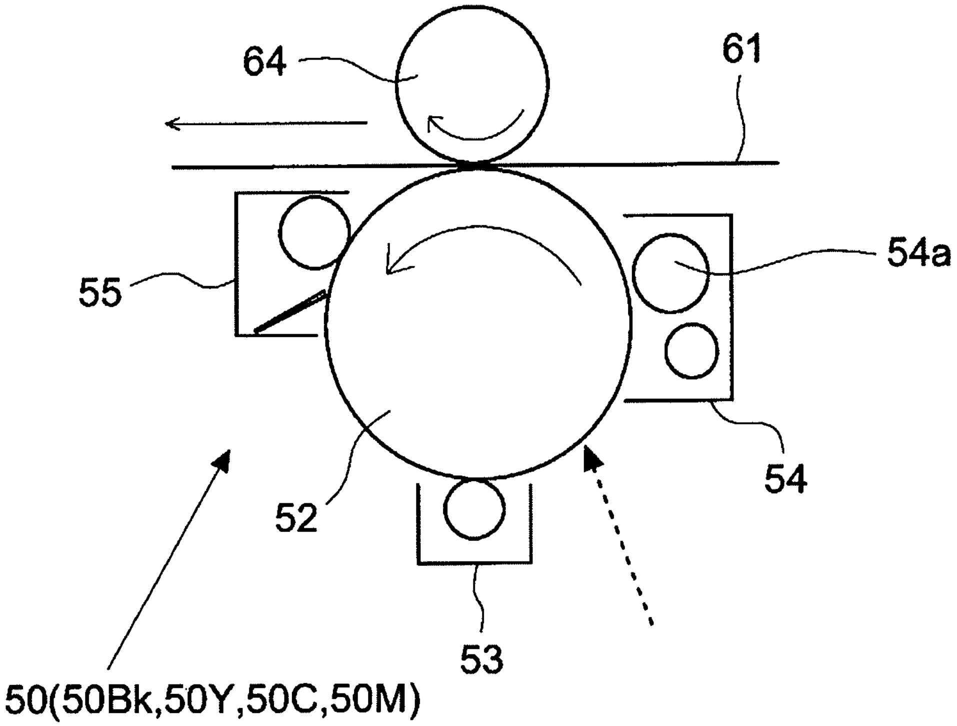
FIG. 2 is a partially enlarged schematic sectional view of an image forming part according to the first embodiment of the invention.

Next, based on FIGS. 1 and 2, the image forming part 5*a* of the multi-function printer 100 according to the first embodiment of the invention will be described. FIG. 2 is a partially enlarged schematic sectional view of the image forming part 5*a* according to the first embodiment of the invention.

The image forming part 5*a* forms the images on the photosensitive drums 52 as image carriers based on the image data. The image forming part 5*a*, as shown in FIG. 1, includes: four image forming units 50Bk (for forming a black image), 50Y (for forming a yellow image), 50C (for forming a cyan image), and 50M (for forming a magenta image); an exposure device 51 that performs optical scanning and exposure on the charged photosensitive drums 52 based on the image data to thereby form electrostatic latent images; etc. That is, the image forming part 5*a* includes a plurality of image forming units 50, etc. for the purpose of forming a color image.

In this manner, the multi-function printer 100 of this embodiment can form a color toner image (color image) by using toners of a plurality of colors. Note that the image forming units 50 use the mutually different toner colors but have the same basic configuration, and thus symbols Bk, Y, C, and M will be omitted in the description below unless specifically described.

As shown in FIG. 2, each of the image forming units 50 includes the photosensitive drum 52 as the image carrier which is so supported as to be rotatable in a direction of arrow shown in the same figure and which is driven by a main motor 5M (see FIG. 3) or the like into rotation in a predetermined direction. Moreover, arranged around the photosensitive drum 52 are: a charging device 53, a developing device 54, and a cleaner 55.

The charging device 53 uniformly charges a surface of the photosensitive drum 52 to a predetermined potential. The exposure device 51 subjects the surface of the charged photosensitive drum 52 to scanning and exposure in accordance with the image data. The developing device 54 is provided with a developing roller 54*a* which carries a toner and to which developing bias is applied for the purpose of dispersing the toner to the photosensitive drum 52. The developing device 54 supplies the toner to the electrostatic latent image to develop the image (visualize the image). The cleaner 55 cleans the surface of the photosensitive drum 52. With this configuration, the image is formed on the peripheral surface of each of the photosensitive drums 52 and then primarily transferred to the intermediate transfer mechanism 6.

The exposure device 51 of the multi-function printer 100 of this embodiment is a laser unit that, based on an inputted color-separated image signal, outputs laser light (shown by broken lines) as light signals to the respective photosensitive drums 52. Then the exposure device 51 performs scanning and exposure on each of the charged photosensitive drums 52 to form the electrostatic latent image. For example, the exposure device 51 has therein: laser devices 57 (for example, semiconductor laser); a polygon mirror that reflects the laser light; a polygon motor 56 (see FIG. 3) that rotates the polygon mirror; an fθ lens for scanning the laser light, which has been reflected by the polygon mirror, in an axial direction of each of the photosensitive drums 52 at a constant speed; a mirror (not shown) that guides the laser light to the photosensitive drums 52; etc. With this configuration, the laser light is irradiated from the exposure device 51 to each of the photosensitive drums 52 and the electrostatic latent images in accordance with the image data are formed onto the photosensitive drums 52. Note that for the exposure device 51, the one having light emitting elements such as LEDs arranged in an array may be used (Hardware Configuration of the Multi-Function Printer 100)

Figure 3:
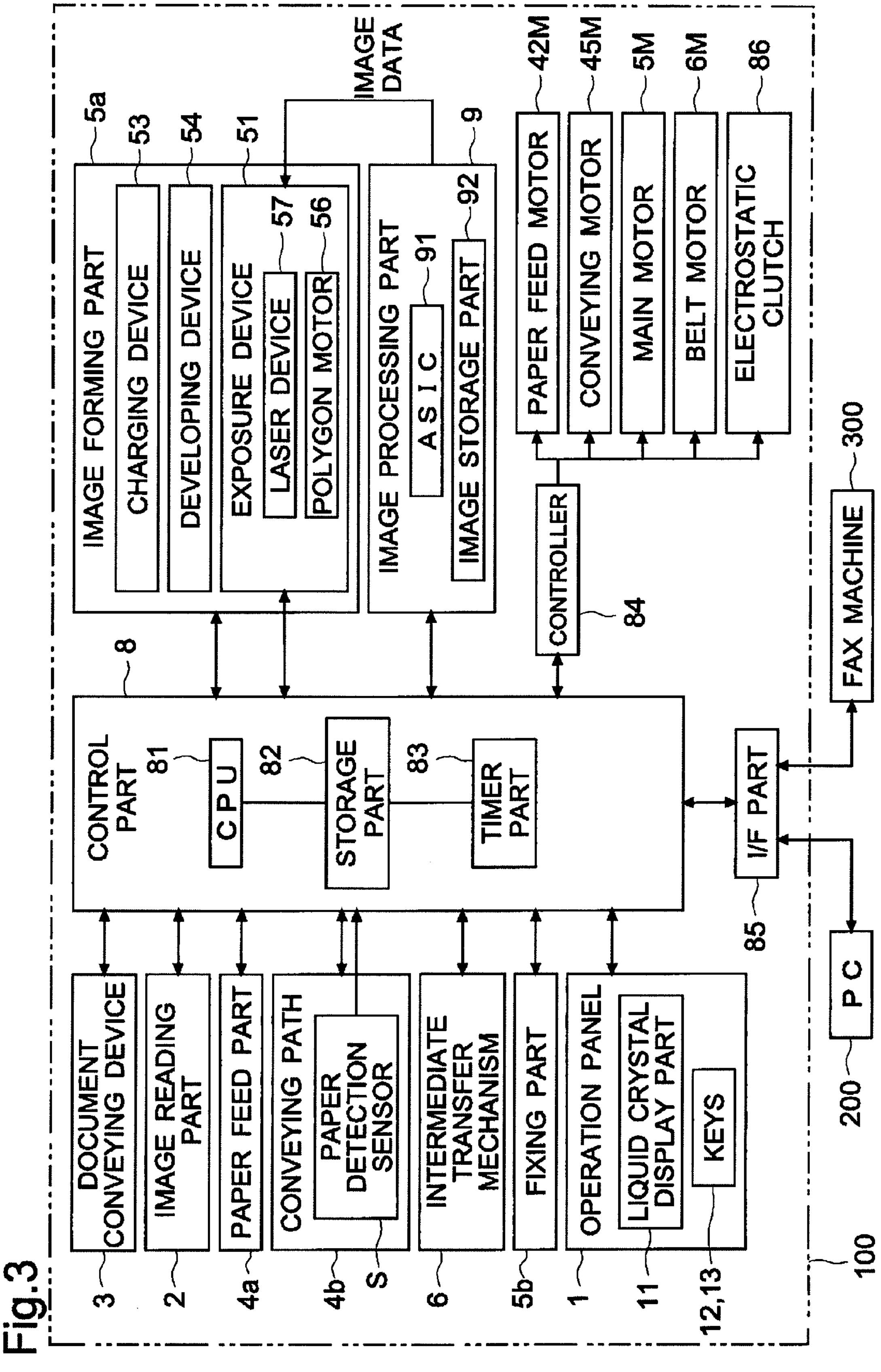
FIG. 3 is a block diagram showing one example of configuration of the multi-function printer according to the first embodiment of the invention.

Next, based on FIG. 3, hardware configuration of the multi-function printer 100 according to the first embodiment of the invention will be described. FIG. 3 is a block diagram showing one example of the configuration of the multi-function printer 100 according to the first embodiment of the invention.

First, in the multi-function printer 100, a control part 8 is provided which performs control of various parts of the multi-function printer 100 and which is in charge of control of printing, etc. The control part 8 is composed of: for example, a CPU 81, a storage part 82, a timer part 83, etc. Note that the control part 8 may be provided in a plurality of kinds divided for different functions, including: a main control part that performs overall control and image formation; an engine control part that performs image formation, turning ON/OFF of a motor or the like rotating various rotors, etc. and then controls printing; and so on. In this description, these control parts will be shown and described in a collected form.

The CPU 81 is a central processing unit, and performs control of the various parts of the multi-function printer 100 based on a control program stored in the storage part 82. The storage part 82 is formed of volatile and nonvolatile storage devices, such as a ROM, a RAM, an HDD, etc., combined together. This storage part 82 can store various data including: a program for controlling the multi-function printer 100; control data; setting data; image data; etc.

In the invention, the storage part 82 stores a program for controlling operation of the multi-function printer 100 performed upon changing an image formation speed and an image data transmission speed. Moreover, the storage part 82 can store: a page on which the image formation speed and the image data transmission speed have been delayed during a job; and image data of this page. The timer part 83 measures time required for performing controls of the multi-function printer 100, such as detection of timing of the paper feed from the registration roller pair 45 and detection of jam occurrence. The timer part 83 may be realized by using a timer function of the CPU 81.

The control part 8 is connected with signal lines or the like to the various parts such as the document conveying device 3, the image reading part 2, the paper feed part 4*a*, the conveying path 4*b*, the image forming part 5*a*, the intermediate transfer mechanism 6, the fixing part 5*b*, the operation panel 1, an image processing part 9, a controller 84, an I/F part 85 (corresponding to a communication part), etc. The control part 8 controls the various parts described above to control the operation of the device (multi-function printer 100) for printing control. Moreover, the control part 8, based on output of the paper detection sensor S (paper detector), recognizes paper arrival at the paper detection sensor S (paper detector) and paper passage therethrough.

First, the control part 8, by using the paper detection sensor S, detects whether or not the paper fed from the paper feed part 4*a* has arrived at an upstream side of the registration roller pair 45. The paper detection sensor S, in response to the paper arrival, changes the output from the light receiving part. The control part 8 recognizes this change by the CPU 81 or the like to detect the paper arrival at the paper detection sensor S.

Next, the I/F part 85 is provided for performing data transmission and reception (including reception of image data for performing image formation) to and from external devices such as a PC 200 (personal computer). The control part 8 can communicate with the PC 200 by using the I/F part 85 through a network, direct connection of a cable, etc. For example, the control part 8 receives image data and setting data related to printing and performs printing based on these data (print function). Moreover, the control part 8 can transmit the image data read at the image reading part 2 to the PC 200 (scanner function). Furthermore, to the I/F part 85, a fax machine 300 can be connected, so that the control part 8 can transmit and receive image data, etc. to and from the fax machine 300 (fax function, in which case for example, a modem or the like is loaded in the I/F part 85). A plurality of PC 200 and a plurality of fax machines 300 are connected to the multi-function printer 100 in such a manner as to be communicatable therewith, but in FIG. 3, only one each is illustrated.

Furthermore, in the PC 200, a storage device (for example, HDD) is loaded, and driver software for using the multi-function printer 100 is installed. Via the I/F part 85, data may be transmitted from the control part 8, and based on this received data, various messages such as an error occurrence message can also be displayed on a display of the PC 200.

Moreover, the control part 8 is connected to the operation panel 1, and recognizes contents of input such as various settings made on the operation panel 1. Moreover, the control part 8 can also indicate contents of a display to be provided on a liquid crystal display part 11 of the operation panel 1.

Moreover, the control part 8 is connected to the controller 84 that controls motors for respectively rotating the various rotors in the multi-function printer 100. The controller 84 receives instructions from the control part 8 and controls rotation of the motors connected to the controller 84. That is, via the controller 84, the control part 8 can control, for example, turning ON/OFF of the rotation of each of the motors.

Connected to the controller 84 are: a paper feed motor 42M that rotates the paper feed rollers 42; a conveying motor 45M that rotates the conveying rotors, such as the conveyance roller pairs 44 and the registration roller pair 45, provided on the conveying path 4*b*; a main motor 5M that rotates the rotors such as the photosensitive drums 52 in the respective image forming units 50; a belt motor 6M that is connected to the driving roller 62 and that rotates the intermediate transfer belt 61; and so on. Moreover, the controller 84 is connected to an electromagnetic clutch 86 connected to a rotation axis of the registration roller pair 45. The electromagnetic clutch 86 is provided for turning ON/OFF connection for transmission of a driving force to the registration roller pair 45. The control part 8, in synchronization with the secondary transfer, links the clutch to start the rotation of the registration roller pair 45.

The control part 8, for example, can control rotation speeds of the main motor 5M and the belt motor 6M to control a rotation speed of each of the motors in such a manner that an image is formed at a previously defined reference speed. On the other hand, the control part 8 can change the image formation speed (toner image formation speed). For example, the control part 8 can stop the main motor 5M and the belt motor 6M (with the image formation speed set at 0) even during image formation.

Next, image data processing will be described. Image data inputted to the multi-function printer 100 include: for example, data acquired by reading a document with the image reading part 2; and image data received from the PC 200 or the like via the I/F part 85. These image data are, for example, inputted to the image processing part 9 through the control part 8. Note that the image data may be directly inputted to the image processing part 9 from the image reading part 2 or the I/F part 85.

The image processing part 9 performs various types of image processing on the image data and transmits the image data used for the image formation to the image forming part 5*a*. For example, the image processing part 9 includes: an ASIC 91 as an integrated circuit having a plurality of image-processing functions (for example, a zoom function, a density change function, an aggregation function of aggregating a plurality of images into one piece, etc.) all brought into one; an image storage part 92 (corresponding to a storage part) as a working region where the image data before and after the image processing is temporarily stored; etc. The image processing part 9 executes an extraordinary variety of image processing, and thus assuming that it can perform well-known image processing, a detailed description of each image processing will be omitted unless specifically described. Moreover, in implementing the invention, the image storage part 92 can store: a page on which the image formation speed and the image data transmission speed have been delayed; and image data of this page.

For example, in a case of printing such as copying, the image data subjected to the processing at the image processing part 9 are sequentially transmitted to the exposure device 51. Then the exposure device 51, based on the received image data, lights up/off the laser devices 57 respectively prepared for different colors, thereby forming the electrostatic latent images on the surfaces of the charged photosensitive drums 52.

In the multi-function printer 100 according to the invention, the image formation speed can be changed. Even when the image formation stops in the middle of operation, if a speed of image data transmission to the exposure device 51 remains the same, an overflow of the image data possibly occurs at the exposure device 51. Thus, the image processing part 9, in accordance with the change in the image formation speed, can change the speed of the image data transmission to the exposure device 51. For example, when the image formation has been stopped, the image processing part 9 stops the image data transmission to the exposure device 51. Moreover, the image processing part 9 restarts the image data transmission simultaneously with restart of the image formation.

Here, control of the image forming part 5*a* by the control part 8 will be described. At the time of image formation (toner image formation), the control part 8 performs the charge operation by the charging device 53 and the developing bias application at the developing roller 54*a* of the developing device 54. Moreover, the control part 8 provides the exposure device 51 with instructions for the rotation speed of the polygon motor 56 with respect to speeds of the scanning and the exposure performed on the photosensitive drums 52 (a travel speed of a laser light irradiation position in the axial direction of the photosensitive drums 52) and with instructions for lighting up/off the laser devices 57. At a speed in accordance with these instructions, the exposure device 51 rotates the polygon motor 56.

The multi-function printer 100 according to the invention can change the image formation speed. When the image formation has stopped in the middle of operation, unless the laser devices 57 of the exposure device 51 are turned off, there is a possibility that erroneous exposure is performed. Note that, when the image formation has stopped in the middle of operation, the polygon motor 56 may be either stopped or continuously rotated.

Then the control part 8, in accordance with the change in the image formation speed, provides instructions for lighting up/off the laser devices 57 and turning ON/OFF of the rotation of the polygon motor 56 in the exposure device 51. For example, when the image formation has been stopped, the control part 8 provides the instructions for lighting off the laser devices 57, keeping the rotation of the polygon motor 56. Moreover, the control part 8 provides instructions for restarting the scanning and the exposure in synchronization with restart of image formation at a different portion, such as restart of the rotation of the photosensitive drums 52 upon restart of image formation.

(Check Time Point and Stop of Image Formation)

Figure 4:
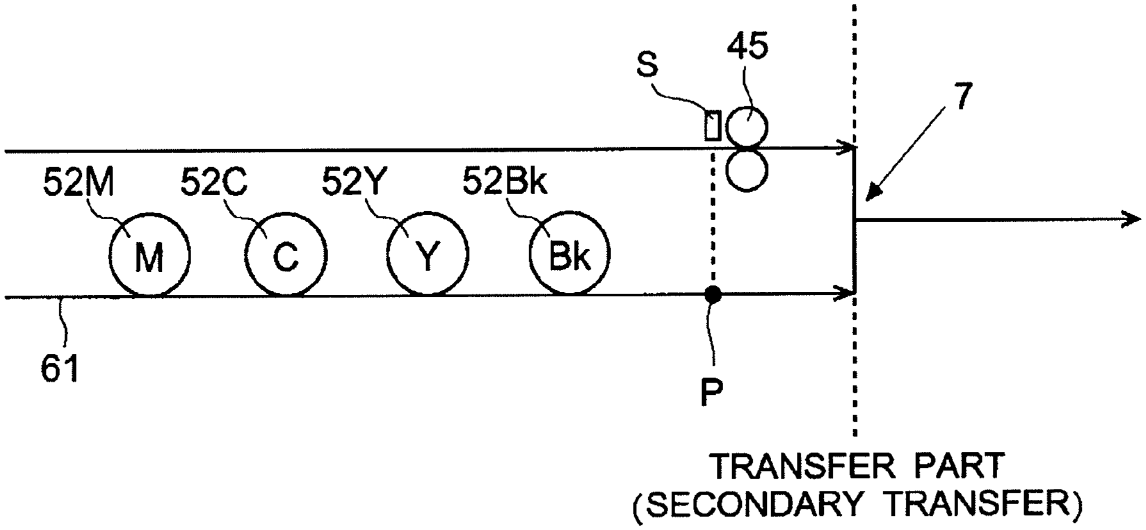
FIG. 4 is an explanatory diagram showing one example of a check time point in the multi-function printer according to the first embodiment of the invention.

Next, based on FIG. 4, one example of stop of the image formation in the multi-function printer 100 according to the first embodiment of the invention will be described. FIG. 4 is an explanatory diagram showing one example of a check time point in the multi-function printer 100 according to the first embodiment of the invention.

First, as configuration for conveying paper to the registration roller pair 45, the paper feed rollers 42 and the conveyance roller pairs 44 are provided (see FIG. 1). Abrasion of the paper feed rollers 42 and/or the conveyance roller pair 44 may cause slipping upon the paper conveyance. Moreover, due to various factors such as abrasion or resistance between sheets of paper due to static electricity or moisture, delivery of topmost paper in the paper feed part 4*a* may be delayed. Moreover, during continuous printing, as a result of paper-out at the upper cassette 41*a*, a source of the paper feed may be changed to the lower cassette 41*b*, thus extending a distance over which the paper is conveyed to the registration roller pair 45. Consequently, a delay may occur in paper arrival at the registration roller pair 45 and the transfer part 7.

In conventional practice, in order that images are transferred without any displacement from a transfer position of paper, upon the delay in the paper arrival at the registration roller pair 45, a period during which the paper stops at the registration roller pair 45 is shortened. However, even if the paper-stopping period is at zero, when the images (toner images) arrive at the transfer part 7 ahead of the paper, the images cannot be transferred onto an appropriate position of the paper. Then, in the conventional practice, upon the delay in the paper arrival to a degree exceeding a limit on a period gained by shortening the paper-stopping period, the images formed (primarily transferred) onto the intermediate transfer belt 61 are disposed.

For example, to dispose the images on the intermediate transfer belt 61, a mechanism may be provided which separates the secondary transfer roller 66 from the intermediate transfer belt 61 (for example, the secondary transfer roller is moved with a solenoid or the like). Moreover, upon the disposal of the images on the intermediate transfer belt 61, a voltage with the same polarity as toner charge polarity and with an absolute value larger than that of a toner charge potential is applied to the secondary transfer roller 66. Then the images not secondarily transferred are collected at, for example, the belt cleaning device 65. Note that the multi-function printer 100 of this embodiment also adopts any of the configuration described above.

However, in this embodiment, at a time point before the images arrive at the transfer part 7 after image formation started before paper arrival at the registration roller pair 45, it is checked whether or not the paper has arrived at the registration roller pair 45. If the paper has not arrived there, the control part 8 stops the image formation. Consequently, even with the delay in the paper arrival to a degree over the limit that permits the shortening of the period during which the paper is stopped at the registration roller pair 45, the images can be secondarily transferred from a predetermined start position of the paper.

Then one example of the stop of the image formation will be described, referring to FIG. 4. In FIG. 4, an upper line denotes one example of a paper conveying path, and a lower line denotes one example of an image travel path. Moreover, in FIG. 4, figures marked with letters Bk, Y, C, and M denote the photosensitive drums 52 of the respective colors.

The paper supplied from the paper feed part 4*a* is conveyed through the conveying path 4*b* and arrives at the registration roller pair 45 shown in FIG. 4. The paper detection sensor S is provided upstream of the registration roller pair 45 in the paper conveyance direction. The transfer part 7 is located downstream of the paper detection sensor S. On the other hand, the images formed on the photosensitive drums 52 of the image forming units 50 of the respective colors are primarily transferred onto the intermediate transfer belt 61. First, the magenta image is transferred from the magenta photosensitive drum 52 onto the intermediate transfer belt 61. Next, the cyan image is primarily transferred onto the intermediate transfer belt 61 in such a manner as not to be displaced with respect to the magenta image. Then the yellow and black images are primarily transferred in the same manner, whereby the images of the different colors are superimposed on each other. Then the images superimposed on each other on the intermediate transfer belt 61 are directed by the rotation of the intermediate transfer belt 61 to the transfer part 7.

Here, provided in the multi-function printer 100 of this embodiment is a check time point before a tip of the images formed on the intermediate transfer belt 61 after the start of the image formation enters the transfer part 7. For example, in FIG. 4, the check time point corresponds to time when the tip of the images has arrived at a check spot P marked with ●. Specifically, the check spot P of this embodiment is provided between the black image forming unit 50Bk and the secondary transfer roller 66 (see FIG. 1). In other words, the check time point corresponds to any time point in a period during which the tip of the images lies between the image forming unit 50Bk closest to the transfer part 7 and the transfer part 7.

Then the time when the tip of the images has arrived at the check spot P (when the tip of the images lies between the black image forming unit 50Bk and the secondary transfer roller 66) becomes the check time point. The control part 8, at the check time point, checks whether or not the paper arrival has been detected by the paper detection sensor S. If the paper arrival cannot be confirmed, the control part 8 stops the image formation.

Specifically, in the multi-function printer 100 of this embodiment, the image forming part 5*a* starts the image formation before the paper arrival detection of by the paper detection sensor S, and if the paper arrival cannot be detected by the paper detection sensor S at the check time point provided during the period between the start of the image formation and the arrival of the tip of the images at the transfer part 7, the control part 8 delays the image formation speed at the image forming part 5*a* and the image data transmission speed of the image processing part 9.

For example, assume that the check time point corresponds to a time point at which the images arrive at a spot moved upstream of the transfer part 7 by a distance obtained by multiplying, by an image travel speed, time required for paper conveyance over a distance from the paper detection sensor S or the registration roller pair 45 to the transfer part 7 (if considering the paper margin, a distance corresponding to the margin is also added).

Moreover, for example, if a speed of image travel to the transfer part 7 is equal to a paper conveyance speed, the check time point can be a time point at which the images arrive at a spot moved upstream of the transfer part 7 by a distance equal to a distance between the transfer part 7 and the paper detection sensor S (if considering the paper margin, a distance corresponding to the margin is also added). Consequently, restarting the image formation simultaneously with the paper arrival detection by the photo detection sensor S permits the images to be performed at a predetermined position of the paper.

Note that the control part 8 can recognize the time (check time point) when the tip of the images has arrived at the check spot P. For example, assuming that the image formation is performed while circumferential speeds of the intermediate transfer belt 61 and the photosensitive drums 52 are constant, the period from the start of the image formation to the image arrival at the check spot P is constant. Therefore, for example, previously recognizing the period from the start of the image formation to the image arrival at the check spot P and then counting down passage of the previously recognized period after the start of the image formation permits recognizing the time (check time point) when the tip of the images has arrived at the check spot P. Note that this time measurement may be performed by the timer part 83 or the CPU 81.

(Display Related to Stop of Image Formation)

Figure 5A:
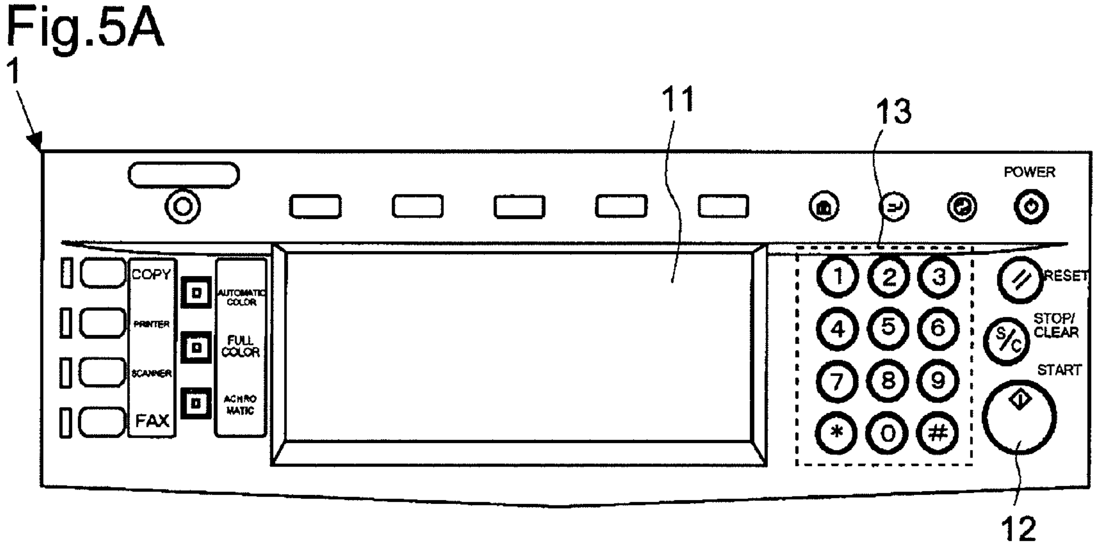
FIG. 5A is a plan view showing one example of an operation panel according to the first embodiment of the invention.

Next, based on FIGS. 5A to 5C, one example of a display related to the stop of the image formation in the multi-function printer 100 according to the first embodiment of the invention will be described. FIG. 5A shows one example of the operation panel 1 according to the first embodiment of the invention, FIG. 5B shows one example of a display for selection whether or not to accept the stop of the image formation, and FIG. 5C shows one example of a display for making a reprint request.

Figure 5B:
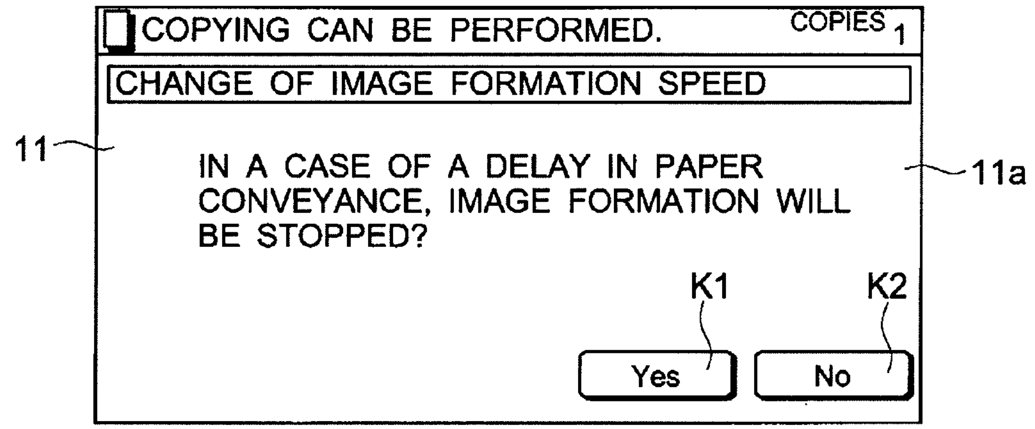
FIG. 5B is an explanatory diagram showing one example of a display for selection whether or not to accept stopping image formation.
Figure 5C:
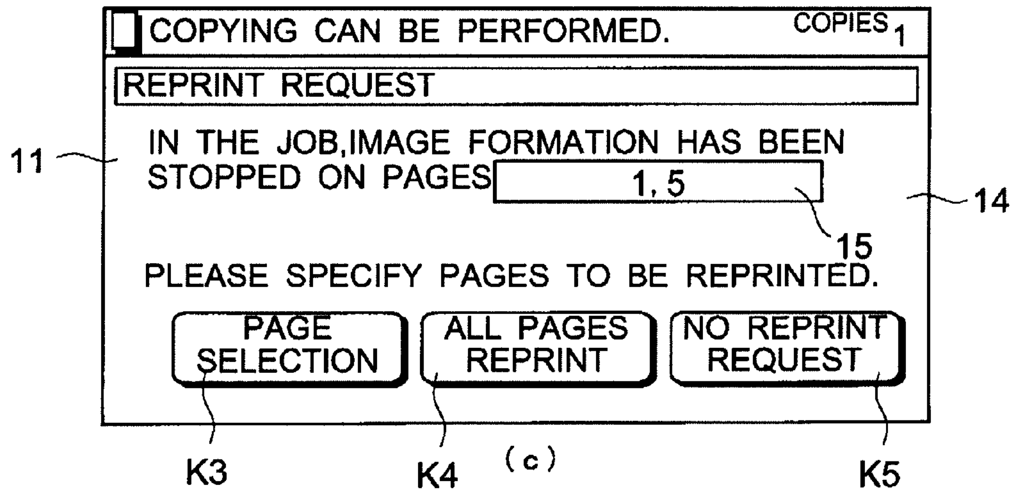
FIG. 5C is an explanatory diagram showing one example of a display for making a reprint request.

Illustrated in FIGS. 5A to 5C is one example of a case where a display is provided on the liquid crystal display part 11 of the operation panel 1 to accept setting input. However, for example, through data transmission from the multi-function printer 100 to the PC 200 or by including a program and data for providing the same displays as those of FIGS. 5B and 5C on drive software installed in the PC 200, the same displays as those of FIGS. 5B and 5C may be provided on the display of the PC 200. Moreover, contents of input with an input device (for example, mouse or keyboard) of the PC 200 may be transmitted toward the multi-function printer 100.

First, based on FIG. 5A, an outline of the operation panel 1 will be described. The operation panel 1 is provided at the front of the multi-function printer 100 in an elevation view (see FIG. 1). Moreover, the operation panel 1 is connected to the control part 8 and provided for the purpose of making settings for printing, etc. The operation panel 1 has: a start key 12 for providing instructions for starting the operation of the multi-function printer 100; the liquid crystal display part 11 of a touch-panel type; a ten key part 13 for performing numerical input; and so on. For example, the liquid crystal display part 11 accepts instructions for various settings such as menu selection by use of the touch panel. Moreover, the liquid crystal display part 11 displays messages such as a status of the multi-function printer 100 for the user.

Next, based on FIG. 5B, the selection whether or not to accept the stop of the image formation will be described. When the image formation has been stopped, compared to a case where printing is performed without stopping the image formation, image quality of a printed material may deteriorate (for example, an image at a stop position may be disturbed). However, for a printed material with characters only, it is possible in some cases to read the characters even with some degree of disturbance in the image quality. On the other hand, for a printed material, such as a printed material of a photo, in which graduations change continuously, an influence of the image quality deterioration is great in some cases. Moreover, whether or not the image quality is prioritized depends on an intention of the user. Thus, as shown in FIG. 5B, whether or not to stop the image formation can be previously selected by the user.

A selection screen 11*a* shown in FIG. 5B can be reached by, for example, repeatedly pressing the touch panel by the user. On the selection screen 11*a*, an Yes key K1 and a No key K2 are arranged. When the Yes key K1 has been pressed, data indicating that the image formation can be stopped is transmitted to the control part 8 and saved into the storage part 82, etc. Then if paper arrival has not been detected at the check time point, the control part 8 stops the image formation. On the other hand, when the No key K2 has been pressed, as is the case with the conventional practice, the period during which the paper stops at the registration roller pair 45 is reduced or the images are disposed to cope with the delay in the paper arrival. That is, the operation panel 1 accepts input of selection whether or not to accept delay of the image formation speed and the image data transmission speed, and only when settings for accepting the delay of the image formation speed and the image data transmission speed has been made, the control part 8 performs control of delaying the image formation speed and the image data transmission speed.

Next, illustrated in FIG. 5C is one example of a display in a case where the image formation is actually stopped and then the job is ended. In some cases, when the user has looked over a printed material after completion of the printing job such as copying for which the image formation were stopped, he/she may desire to perform reprinting in terms of image quality. Considering such a case, when the image formation has been stopped, the liquid crystal display part 11 displays a reprint request screen 14 as shown in .F 5C after the job completion. In order to be ready for reprinting, image data of at least the page on which the image formation has been stopped is stored into the image storage part 92 of the image processing part 9 and the storage part 82 of the control part 8.

For example, display of the page on which the image formation has been stopped is made at a page display section 15 of the reprint request screen 14 (FIG. 5C illustrates one example of a case where the image formation has been stopped on first and fifth pages). Consequently, the user can easily recognize the pages on which the image formation has been stopped. Then on the reprint request screen 14, for example, a page selection key K3, an all pages reprint key K4, a no reprint request key K5, etc. are provided.

When the page selection key K3 has been pressed, for example, the liquid crystal display part 11 display and explores a different window (not shown), so that the user can specify a page to be reprinted. After the page specification, the control part 8 controls the image forming part 5*a*, etc. to perform reprinting the specified page. On the other hand, when the all pages reprint key K4 has been pressed, the control part 8 controls the image forming part 5*a*, etc. to reprint all the pages on which the image formation has been stopped (in FIG. 5C, both the first and fifth pages). Moreover, when the no reprint request key K5 has been pressed, the control part 8, assuming that reprinting is not required, deletes the image data stored in the image storage part 92 and the storage part 82 for the pages on which the image formation has been stopped.

(Image Formation Control)

Figure 6:
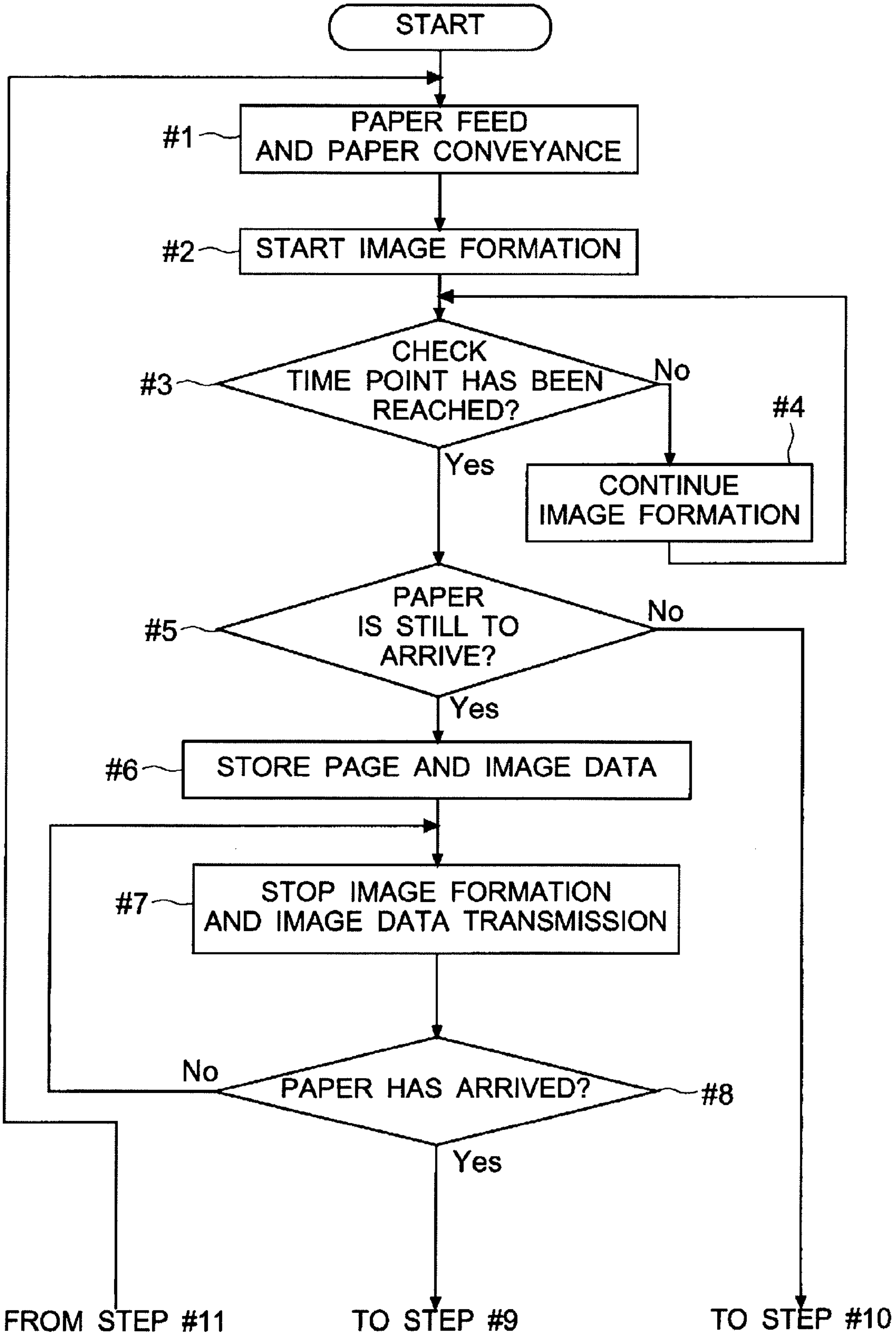
FIG. 6 is a flowchart showing one example of image formation control according to the first embodiment of the invention.
Figure 7:
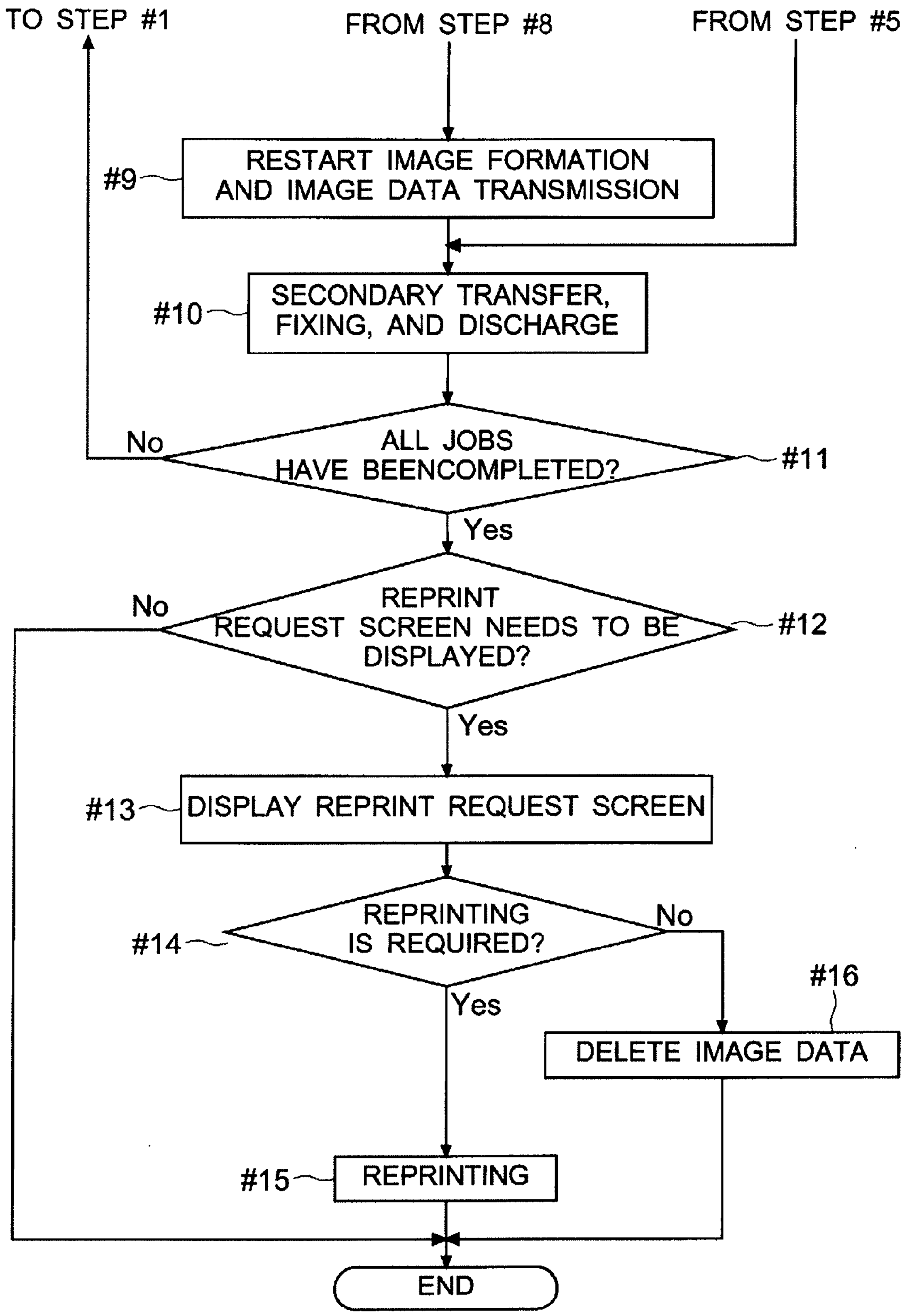
FIG. 7 is a flowchart showing one example of the image formation control according to the first embodiment of the invention.

Next, based on FIGS. 6 and 7, one example of image formation control according to the first embodiment of the invention will be described. FIGS. 6 and 7 show a flow chart showing one example of the image formation control according to the first embodiment of the invention. Note that FIGS. 6 and 7 show two divided drawings of a series of the image formation control. This description refers to a case where the setting for accepting the stop of the image formation has been made on the selection screen 11*a* of FIG. 5B.

First, start in FIG. 6 corresponds to a time point at which instructions for performing printing has been provided from the user to the multi-function printer 100, such as a case where the start key 12 of the operation panel 1 has been pressed or a case where image data and other data have been transmitted from the PC 200. Then the paper feed and the paper conveyance are started (step #1). The toner image (image) formation is performed at each of the image forming units 50 (step #2). Note that step #1 and #2 may be switched, depending on a paper conveyance speed, a distance from a paper feed position to the registration roller pair 45 and the transfer part 7, a distance over which the image travels to the transfer part 7, or the image travel speed (circumferential speed of the intermediate transfer belt 61).

Next, the control part 8 checks whether or not the check time point has been reached since the start of the image formation (step #3). If the check time point has not been reached (No in step #3), the image formation is continued (step #4), and the processing returns to step #3. If the check time point has been reached(Yes in step #3), the control part 8 checks the output of the paper detection sensor S to check whether the paper is still to arrive at the registration roller pair 45 (step #5).

If the paper is still to arrive (Yes in step #5), data indicating a page on which the image formation and image data transmission have been stopped and image data of this page are stored into the storage part 82 and/or the image storage part 92 (step #6). Furthermore, the control part 8 stops the image formation and the image data transmission (step #7). Specifically, the control part 8 stops the main motor 5M and the belt motor 6M to stop travelling of the images. Moreover, the control part 8 stops the exposure operation at the exposure device 51. The control part 8 also stops the voltage application at each of the image forming units 50 (the charging device 53 and the developing bias). Furthermore, the control part 8 stops the image data transmission from the image processing part 9 to the exposure device 51.

Then the control part 8 checks the output of the paper detection sensor S to check whether or not the paper arrival has been detected by the paper detection sensor S (step #8). If the paper arrival has not been detected (No in step #8), the processing returns to step #7. On the other hand, if the paper arrival has been detected(Yes in step #8), the control part 8 restarts the image formation and the image data transmission (step #9). Specifically, if the paper arrival has not been detected at the check time point, the control part 8 stops the image formation at the image forming part 5*a* and the image data transmission of the image processing part 9, after the paper arrival detection by the paper detection sensor S, restart the image formation by the image forming part 5*a*, and restarts the image data transmission by the image processing part 9. In order that the images are transferred without any displacement from a transfer start position of the paper, by measuring timing of restarting the image formation and the image data transmission and timing of the rotation of the registration roller pair 45, paper entrance to the transfer part 7 is performed.

After step #8, or if the paper has already arrived at the registration roller pair 45 (No in step #5), the secondary transfer onto the paper, the image fixation onto the paper, discharge of the printed paper to outside of the machine are performed (step #10). Then the control part 8 checks whether or not all the jobs have been completed (step #11). If not all the jobs have been completed (No in step #11) and thus printing is still required, for example, the processing returns to step #1. On the other hand, if all the jobs have been completed (Yes in step #11), the control part 8 checks whether or not display of the reprint request screen 14 is required (step #12). In other words, the control part 8 checks whether or not the image formation and the image data transmission have been stopped during the job execution.

If the display of the reprint request screen 14 is required (Yes in step #12), the control part 8 displays the reprint request screen 14 on the operation panel 1 (step #13). At this point, the page on which the image formation and the image data transmission have been stopped is displayed. Then the control part 8 makes communication with the operation panel 1 and based on the pressing of the page selection key K3 or the all pages reprint key K4, checks whether or not reprinting is required (step #14). If reprinting is required (Yes in step #14), the control part 8 achieves reprinting by, for example, performing paper feed and paper conveyance and then performing by the image forming part 5*a* the toner image formation while reading the image data from the storage part 82 and/or the image storage part 92, for the page on which the image formation and the image data transmission have been stopped and for which a reprint request has been made. (step #15).

On the other hand, if the display of the reprint request screen 14 is not required (No in step #12) or if reprinting is not required as a result of pressing the no-reprint request key k5 (No in step #14), the processing ends (END). At this point, the control part 8 may delete from the storage part 82 and the image storage part 92 the image data of the page on which the image formation and the image data transmission have been stopped (step #16). That is, the control part 8, after the job completion, performs reprinting of the page on which the image formation and the image data transmission have been stopped. However, the operation panel 1 accepts input of the request for reprinting the page on which the image formation speed and the image data transmission speed have been delayed, and only when the reprint request has been inputted to the operation panel 1, the control part 8 performs reprinting of the page on which the image formation speed and the image data transmission speed have been delayed.

The above description of the flowchart refers to the example in which the display of the reprint request screen 14 is provided on the operation panel 1. Alternatively, in a case where the multi-function printer 100 performs printing as a printer in response to image data transmission from the PC 200, the data may be transmitted from the I/F part 85 to the PC 200 and the same display as that of the reprint request screen 14 may be provided on the display of the PC 200 (step #13). Moreover, the multi-function printer 100, based on whether or not data indicating that the page selection key K3 or the all pages reprint key K4 has been selected through input to the same screen as the reprint request screen 14 displayed on the display of the PC 200 has been received from the PC 200, may check whether or not reprinting is required (step #14). That is, the control part 8 transmits from the I/F part 85 to the external device (PC 200) the data indicating the page on which the image formation speed and the image data transmission speed have been delayed during a job, and when the I/F part 85 has received from the external device a reprint request for the page on which the image formation speed and the image data transmission speed have been delayed, reprint the page on which the image formation speed and the image data transmission speed have been delayed.

As described above, with the configuration of the image forming apparatus (for example, multi-function printer 100) of this embodiment, if the paper arrival cannot be detected at the check time point, the image formation speed and the image data transmission speed become slower. Therefore, the time of the image arrival at the transfer part 7 is more delayed than that in a case where the image formation is performed at a normal speed. That is, the image arrival at the transfer part 7 is delayed in accordance with the delay in the paper arrival. Therefore, the images can be easily transferred without any displacement from the transfer start position of the paper. Moreover, there is no need of disposing the temporarily-formed images as a result of the delay in the paper arrival, thus resulting in no wasteful consumption of an image-forming material (for example, toner). Moreover, compared to a case where the image formation is performed again, overall time required for printing is shorter Moreover, if the paper arrival cannot be detected at the check time point, the image formation is stopped. Consequently, even with any delay in the paper arrival, the image arrival at the transfer part 7 before the paper arrival at the transfer part 7 can be prevented. Moreover, a change in the image formation speed and the image data transmission speed may result in image quality deterioration. Since some users value the image quality while some users do not value the image quality, the user can select whether or not to delay the image formation speed and the image data transmission speed. Consequently, control of delaying the image formation speed and the image data transmission speed is performed only when the user has selected to do so. Therefore, an intention of the user can be reflected on the image formation control.

Moreover, the page on which the image formation speed and the image data transmission speed have been changed is reprinted. Consequently, the user can easily replace the page. Moreover, the user can input instructions for reprinting the page on which the image formation speed and the image data transmission speed have been changed. Consequently, the page on which the image formation speed, etc. have been changed is reprinted only when the user desires to do so. Therefore, the user, after checking a printed material to check whether or not the image quality is satisfactory, can provide the instructions for reprinting, so that unnecessary reprinting is never performed by the user.

Moreover, in performing the image formation in response to the image data transmission from the external device (for example, PC 200), the fact that the image formation speed and the image data transmission speed have been changed and the relevant page are notified to the PC 200. Consequently, the user can recognize the page to be checked. Moreover, the user can provide, from its own PC 200, the instructions for reprinting the page on which the image formation speed, etc. have been changed. The page on which the image formation speed and the image data transmission speed have been changed is reprinted only when the user desires to do so. Moreover, the user can provide from the PC 200 the instructions for reprinting.

(Second Embodiment)

Next, using FIGS. 3 and 8 to 11, a multi-function printer 100 according to the second embodiment of the invention will be described. Here, the multi-function printer 100 shown in second embodiment differs from that of the first embodiment in that, when paper arrival at a registration roller pair 45 has been delayed, without stopping image formation and image data transmission to an exposure device 51, an image formation speed and an image data transmission speed are decreased. Note that basic configuration of the multi-function printer 100 descried referring to FIGS. 1 to 3 is the same as that of the first embodiment. Therefore, for common portions, the description of the first embodiment applies, and thus only points different from those of the first embodiment will be described and illustrated below.

(Hardware Configuration of the Multi-Function Printer 100)

First, referring to FIG. 3, hardware configuration of the multi-function printer 100 of the second embodiment will be described. First, in the multi-function printer 100, a control part 8 is provided which performs control of various parts of the multi-function printer 100 and which is in charge of control of printing, as is the case with the first embodiment. Moreover, the control part 8, by using a paper detection sensor S, detects whether or not paper has arrived at the registration roller pair 45, as is the case with the first embodiment.

As is the case with the first embodiment, the control part 8, for example, can control rotation speeds of a main motor 5M and a belt motor 6M to control a rotation speed of each of the motors in such a manner that an image is formed at a previously defined reference speed, and the control part 8 can change an image formation speed (toner image formation speed). However, in this embodiment, without stopping but, for example, decreasing the rotation speeds of the main motor 5M and the intermediate transfer mechanism 6 from reference speeds, the image formation speed can be gradually decreased. Moreover, from the condition that the image formation speed is lower than the reference speed, the rotation speeds of the main motor 5M and the belt motor 6M can be increased to increase the image formation speed to the reference speed.

Next, image data processing in this embodiment will be described. Configuration of an image processing part 9, image data inputted to the image processing part 9, a point that processed image data is transmitted to an exposure device 51 to be used in image formation, etc. are similar to those in the first embodiment.

The image processing part 9 of the multi-function printer 100 according to the invention, in accordance with the change in the image formation speed, can change a speed of the image data transmission to the exposure device 51. The image processing part 9 of this embodiment, in accordance with the decrease in the image formation speed, decreases the speed of the image data transmission to the exposure device 51. Moreover, the image processing part 9, with an increase in the image formation speed, increases the image data transmission speed. For example, since the image formation speed changes in accordance with the rotation of the main motor 5M and the belt motor 6M, defining the image data transmission speed in accordance with the rotation speeds of the main motor 5M and the belt motor 6M for each type of the image forming apparatus permits the image data to be transmitted to the exposure device 51 without any abnormality.

For example, assuming that the rotation speeds of the main motor 5M and the belt motor 6M is ½, an image (toner image) formation speed (a speed of image travel to a transfer part 7) is also ½, and thus the image data transmission speed can also be set at ½. To change the image data transmission speed, the control part 8 and the image processing part 9 may include a circuit for clock delay to lower a clock frequency in image data transfer. Moreover, the control part 8 and the image processing part 9 may, without lowering the clock frequency in the image data transfer, may deliver the image data while taking a longer interval than that in image data transfer at the reference speed to thereby decrease an actual data transmission rate.

Moreover, when the image formation speed has decreased, per-pixel time during which a laser device 57 lights up in the exposure device 51 changes. Moreover, when the image formation speed has decreased, unless a rotation speed of a polygon motor 56 is decreased, a speed of scanning circumferential surfaces of -photosensitive drums 52 is too fast to perform appropriate exposure. Then the control part 8, in accordance with the change in the image formation speed, provides instructions for the per-pixel time during which the laser device 57 lights up and off in the exposure device 51 and the rotation speed of the polygon motor 56.

For example, when the image formation speed has decreased, the control part 8 extends the per-pixel time during which the laser device 57 lights up and off and decreases the rotation speed of the polygon motor 56. Moreover, to return the image formation speed to the reference speed, the control part 8 shortens the per-pixel time during which the laser device 57 lights up and off and increases the rotation speed of the polygon motor 56. For example, assuming that the image formation speed is ½ with respect to the reference speed, compared to a case where the image formation is performed at the reference speed, the per-pixel time during which the laser device 57 lights up and off doubles and the rotation speed of the polygon motor 56 is ½.

(Change in the Image Formation Speed)

Figure 8:
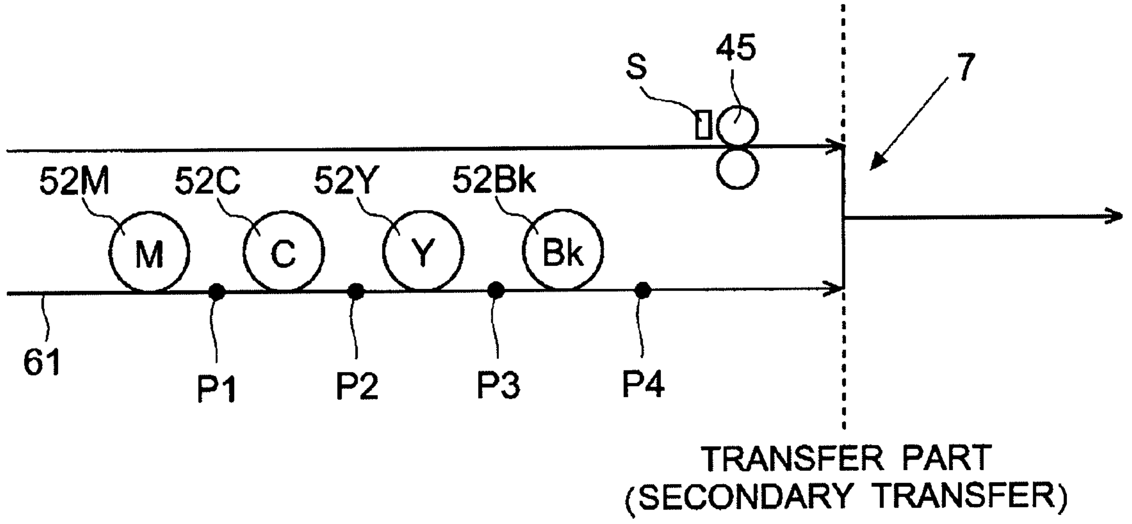
FIG. 8 is an explanatory diagram showing one example of check time points in a multi-function printer according to a second embodiment of the invention.

Next, based on FIG. 8, one example of the change in the image formation speed of the multi-function printer 100 according to the second embodiment of the invention will be described. FIG. 8 is an explanatory diagram showing one example of check time points in the multi-function printer 100 according to the second embodiment of the invention.

Also in this embodiment, at a time point before image arrival at the transfer part 7 after start of the image formation, it is checked by using the paper detection sensor S whether or not paper has arrived at the registration roller pair 45. If the paper has not arrived there, the image formation speed is decreased. Consequently, even with a delay in the paper arrival beyond a limit that permits shortening of the period during which the paper is stopped at the registration roller pair 45, images can be secondarily transferred at a predetermined position of the paper.

Then one example of a case where the image formation speed is decreased will be described, referring to FIG. 8. In FIG. 8, as is the case with FIG. 4, an upper line denotes one example of a paper conveying path, and a lower line denotes one example of an image travel path. Moreover, in FIG. 8, figures marked with letters Bk, Y, C, and M illustrate photosensitive drums 52 of different colors, respectively.

Here, provided in the multi-function printer 100 of this embodiment are a plurality of check time points before a tip of the images formed on an intermediate transfer belt 61 after the start of the image formation enters into the transfer part 7. For example, in FIG. 8, spots denoted with ● are check spots P corresponding to the check time points. Specifically, in this embodiment, four check spots are provided. Specifically, the check spots P are respectively provided: between a magenta photosensitive drum 52M and a cyan photosensitive drum 52C(the first check spot P1, corresponding to the first check time point); between the cyan photosensitive drum 52C and the yellow photosensitive drum 52Y (the second check spot P2, corresponding to the second check time point); between the yellow photosensitive drum 52Y and the black photosensitive drum 52Bk (the third check spot P3, corresponding to the third check time point); and between the black photosensitive drum 52Bk and the secondary transfer roller 66 (the fourth check spot P4, corresponding to the fourth check time point) (see FIG. 1).

Also in this embodiment, between a black image forming unit 50Bk and the secondary transfer roller 66, one check time point (the fourth check time point) is provided (see FIG. 1). In other words, the check time point corresponds to any time point in a period during which the tip of the images lies between the image forming unit 50Bk closest to the transfer part 7 and the transfer part 7. Then times at which the tip of the images has arrived at the respective check spots P are the check time points (the first to fourth check time points). At each of the check spots, the control part 8 checks with the paper detection sensor S whether or not the paper has arrived at the registration roller pair 45. If the control part 8 cannot confirm the paper arrival, it decreases the image formation speed and the image data transmission speed.

For example, assume that the fourth check time point corresponds to a check time point at which the images arrive at a spot located upstream of the transfer part 7 by a distance obtained by multiplying, by an image travel speed, time required for paper conveyance over a distance from the paper detection sensor S or the registration roller pair 45 to the transfer part 7 (if considering the paper margin, a distance of the margin is also added). Moreover, for example, if the speed of the image travel to the transfer part 7 is equal to a paper conveyance speed under the condition that the image formation is performed at the reference speed, a spot located upstream of the transfer part 7 by a distance equal to the distance between the transfer part 7 and the paper detection sensor S (if considering the paper margin, a distance of the margin is also added) can be defined as the fourth check spot P4.

Note that the control part 8 can recognize the time when the tip of the images has arrived at each check spot P (check time point). For example, assuming that circumferential speeds of the intermediate transfer belt 61 and the photosensitive drums 52 at the reference speed are equal to each other and constant and that the way of decreasing the speeds in a case where the paper arrival has not been detected at each check spot P is constant, time from the start of the image formation to the image arrival at each check spot P is constant. Thus, the time from the start of the image formation to the image arrival at each check spot P is previously recognized and stored into the storage part 82, etc. Then, for example, counting the previously recognized time from the start of the image formation to the image arrival at each check spot P permits recognizing the time (check time point) when the tip of the images has arrived at the check spot P. Note that this time measurement may be performed by the timer part 83 or the CPU 81.

(Display Related to Change of Image Formation Speed)

Figure 9A:
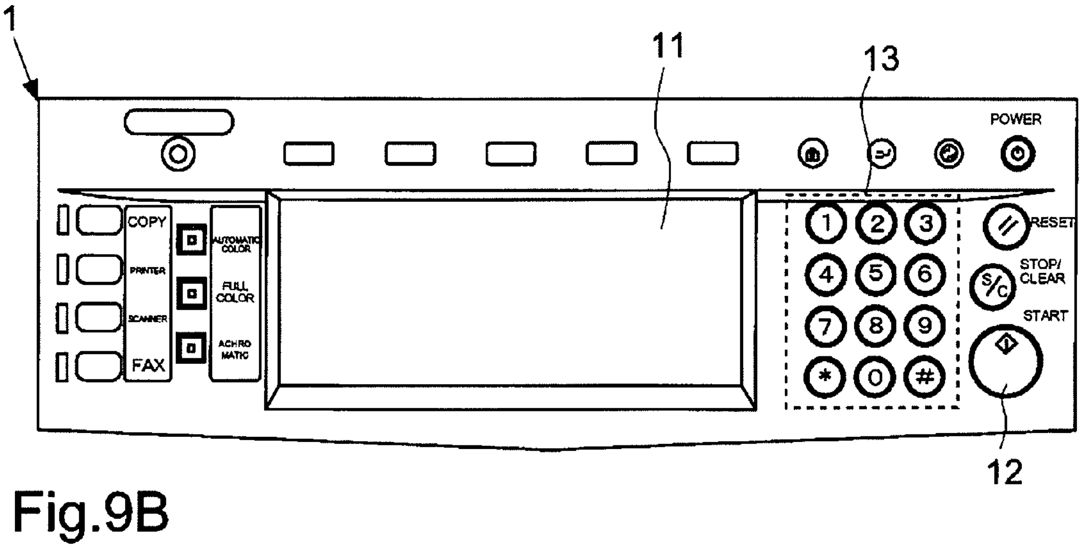
FIG. 9A is a plan view showing one example of an operation panel according to the second embodiment of the invention.

Next, based on FIG. 9A through 9C, one example of a display related to change of the image formation speed in the multi-function printer 100 according to the second embodiment of the invention will be described. FIG. 9A shows one example of an operation panel 1 according to the second embodiment of the invention, FIG. 9B shows one example of a display for selection whether or not to accept the change of the image formation speed, and FIG. 9C shows one example of a display for making a reprint request.

First, as shown in FIG. 9A, basic configuration of the operation panel 1 is the same as that of the first embodiment. Next, based on FIG. 9B, the selection whether or not to accept change of the image formation speed will be described. If the multi-function printer 100 of this embodiment cannot detect the paper arrival at the registration roller pair 45 at each check time point, it decreases the image formation speed and the image data transmission speed. However, changing the speeds such as the image formation speed, etc. may deteriorate the image quality of a printed material compared to a case where printing is performed without changing the image formation speed, etc.

Figure 9B:
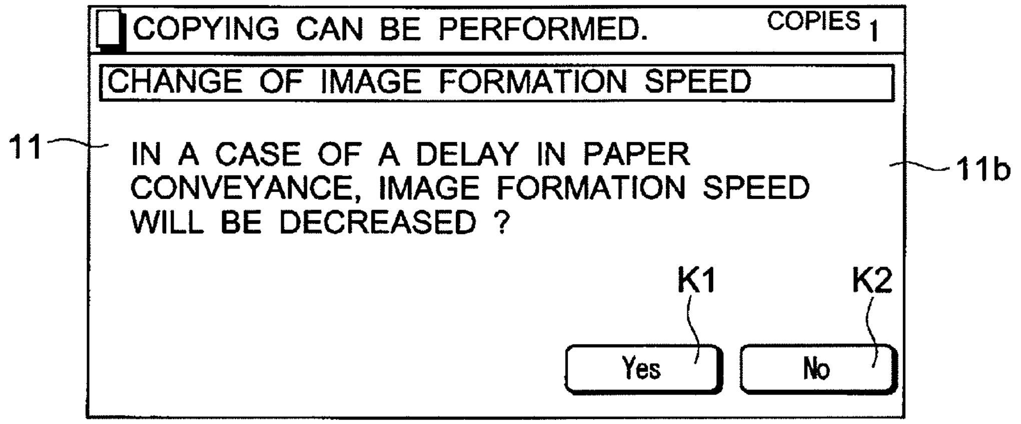
FIG. 9B is an explanatory diagram showing one example of a display for selection whether or not to accept stopping image formation.

A selection screen 11*b* shown in FIG. 9B, as is the case with the first embodiment, can be reached by, for example, repeatedly pressing a touch panel by the user. Then on the selection screen 11*b*, as is the case with the first embodiment, an Yes key K1 and a No key K2 are arranged. If the Yes key K1 has been pressed, data indicating that the change of the image formation speed is accepted is transmitted to the control part 8. Moreover, the data indicating that the change of the image formation speed is accepted is saved into the storage part 82, etc. Then if the paper arrival has not been detected at each check time point, the control part 8 decreases the image formation speed and the image data transmission speed. On the other hand, if the No key K2 has been pressed, as is the case with the conventional practice, the period during which the paper stops at the registration roller pair 45 is reduced or the images are disposed to cope with the delay in the paper arrival.

Figure 9C:
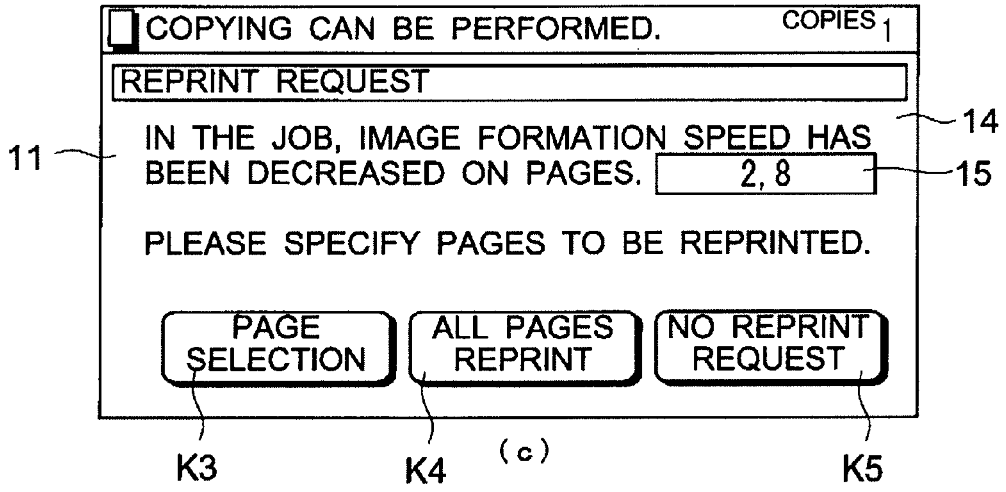
FIG. 9C is an explanatory diagram showing one example of a display for making a reprint request.

Next, FIG. 9C shows one example of a display provided in a case where the image formation speed has been actually changed thereby ending the job. After completion of the printing job such as copying with which the image formation speed and the image data transmission speed have been changed, a reprint request screen 14 as shown in FIG. 9C is provided. Purpose, effect, and advantages thereof are the same as those of the first embodiment.

(Image Formation Control)

Figure 10:
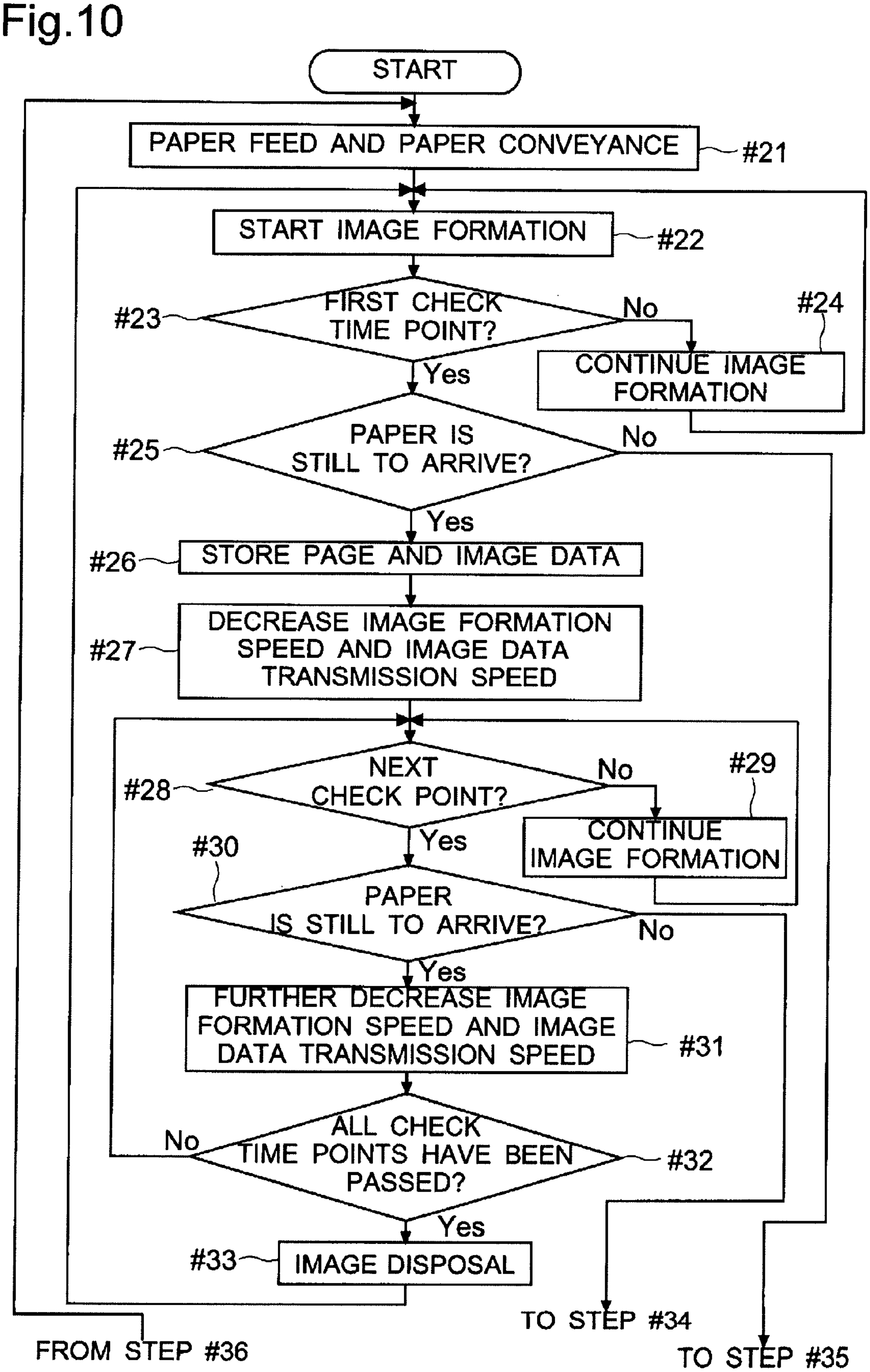
FIG. 10 is a flowchart showing one example of image formation control according to the second embodiment of the invention.
Figure 11:
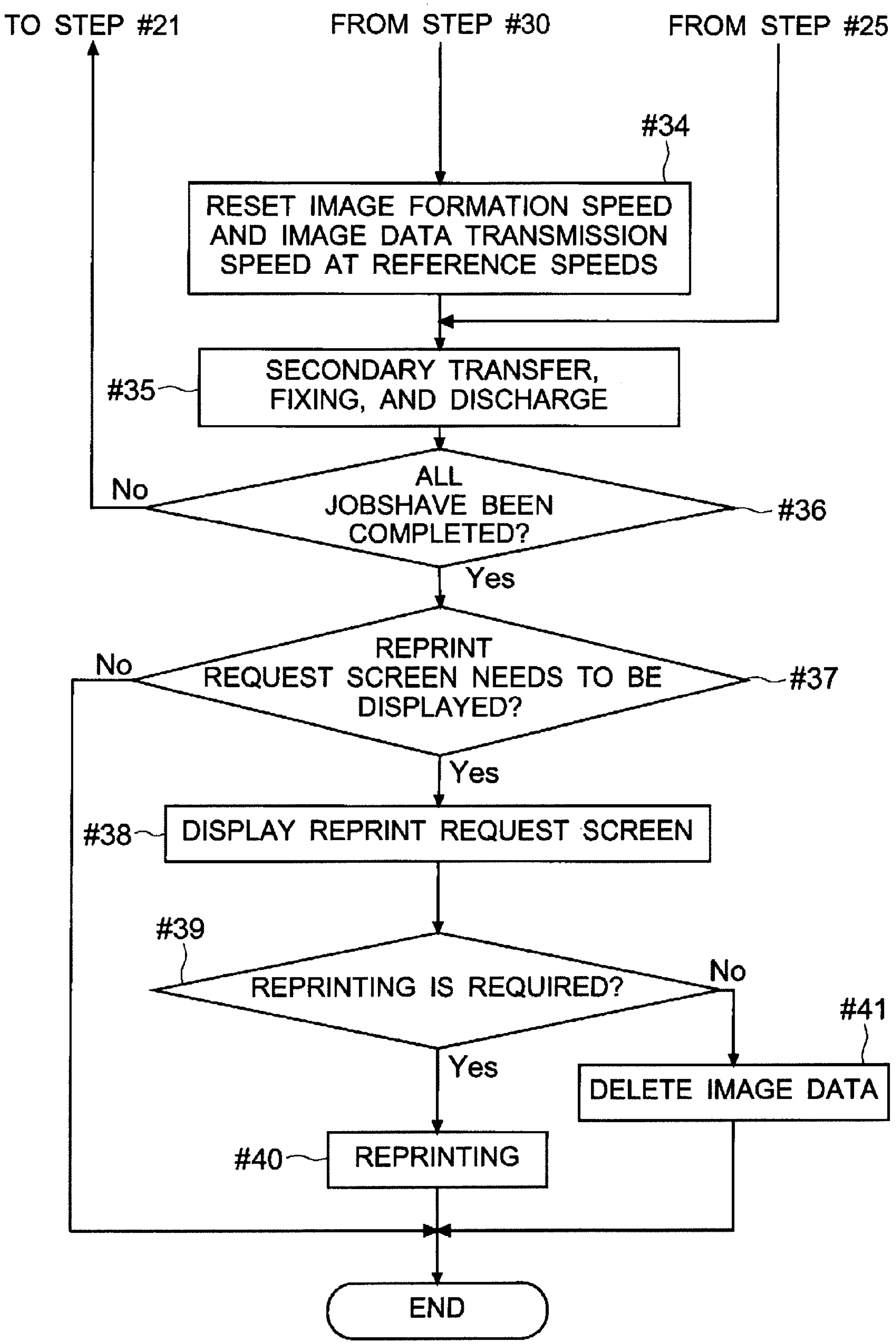
FIG. 11 is a flowchart showing one example of the image formation control according to the second embodiment of the invention.

Next, based on FIGS. 10 and 11, one example of image formation control according to the second embodiment of the invention will be described. FIGS. 10 and 11 show a flow chart showing one example of the image formation control according to the second embodiment of the invention. Note that FIGS. 10 and 11 show two divided drawings of a series of the image formation control. Note that this description refers to a case where setting for accepting decreasing the image formation speed has been made on the selection screen 11*b* of FIG. 9B.

First, start to step #22 of FIG. 10 are the same as the start to step #2 of FIG. 6 (the first embodiment) and thus omitted from the description. Next, the control part 8 checks whether or not the first check time point has been reached since the start of the image formation (step #23). If the first check time point has not been reached (No in step #23), the image formation is continued (step #24), and the processing returns to step #23. If the first check time point has been reached (Yes in step #23), the control part 8 checks output of the paper detection sensor S to check whether or not the paper is still to arrive at the paper detection sensor S (step #25). If the paper has already arrived there (No in step #25), there is no need of changing the image formation speed, etc., and thus the processing proceeds to step #35.

If the paper is still to arrive there (Yes in step #25), data indicating a page currently under the image formation and image data of this page are stored into the storage part 82 and the image storage part 92 (step #26). Furthermore, the control part 8 decreases the image formation speed and the image data transmission speed (step #27). Specifically, the control part 8 instructs the controller 84 to decrease the rotation speeds of the main motor 5M and the belt motor 6M to delay the image travel. Moreover, the control part 8 decreases the number of rotations of the polygon motor 56 at the exposure device 51 to decrease an exposure speed. Moreover, the control part 8 may change parameters such as timing of voltage application at each of image forming units 50 (a charging device 53 and developing bias), frequency, etc. Furthermore, the control part 8 decreases the speed of the image data transmission from the image processing part 9 to the exposure device 51.

Then the control part 8 checks whether or not the next check time point has been reached (step #28). If the next check time point has not been reached (No in step #28), the image formation is continued (step #29) and then the processing returns to step #28. If the next check time point has been reached (Yes in step #28), the control part 8 checks the output of the paper detection sensor S to check whether or not the paper is still to arrive at the paper detection sensor S (step #30).

If the paper is still to arrive there (Yes in step #30), the control part 8 further decreases the image formation speed and the image data transmission speed (step #31). Then the control part 8 checks whether or not all the check time points (four check time points in this embodiment) have been passed (step #32), and if not all the check time points have been passed (No in step #32), the processing returns to step #28. On the other hand, if all the check time points have been passed (Yes in step #32), it is recognized that the paper will not arrive in time by any means, so that without performing transfer to the transfer part 7, the control part 8 achieves image disposal of collecting the images performed by the belt cleaning device 65 (step #33). After step #33, the processing returns to, for example, step #22.

On the other hand, if the paper has arrived there (No in step #30), the image formation speed and the image data transmission speed are reset at the references (original) speed (step #34). Specifically, the control part 8 instructs the controller 84 to increase the rotation speeds of the main motor 5M and the belt motor 6M to thereby speed up the image travel, and also instructs the controller 84 to increase the number of rotations of the polygon motor 56 at the exposure device 51 to increase the exposure speed. Moreover, if the parameters such as the timing of the voltage application at each of the image forming units 50 (the charging device 53 and developing bias), frequency, etc. have been changed, they can be reset at original values. Further, the control part 8 increases the speed of the image data transmission from the image processing part 9 to the exposure device 51.

That is, if the paper arrival at the check time point has not been detected, the control part 8 decreases the image formation speed and the image data transmission speed and after detection of the paper arrival, resets the image formation speed and the image data transmission speed at the original values. Moreover, a plurality of check time points from the start of the image formation at the image forming part 5*a* to the image arrival at the transfer part 7 are provided, and the control part 8 delays the image formation speed and the image data transmission speed in a stepwise fashion every time the paper arrival cannot be detected at each check time point. Then in order that a predetermined position of the paper agrees with a position onto which the images are transferred, the registration roller pair 45 delivers the paper to the transfer part 7, and secondary transfer onto the paper, image fixation onto the paper, and discharge of the printed paper to outside of the machine are performed (step #35).

After step #35, the control part 8 checks whether or not all the jobs have been completed (step #36). Steps #36 to #41 of FIG. 10 of this embodiment are same as steps #11 to #16 of the first embodiment, and thus are omitted from the description.

As described above, with the image forming apparatus shown in the second embodiment, in addition to the effects and advantages of the first embodiment, if the paper arrival cannot be detected at the check time points, the image formation speed and the image data transmission speed are delayed. Consequently, even in a case where the delay in the paper arrival has occurred, the images hardly arrive at the transfer part 7 earlier. Therefore, even with the delay in the paper arrival, the images can be transferred onto the page without any displacement.

Moreover, a plurality of check points are provided, and the image formation speed and the image data transmission speed are delayed every time the paper arrival has not been identified at each check time point. Consequently, in accordance with a status of paper conveyance (degree of delay in the conveyance), the image arrival at the transfer part 7 can be delayed. Moreover, since the image formation speed and the image data transmission speed are reset at the original values at a time point at which the paper arrival has been detected, time of the delay in the image arrival at the transfer part 7 can be minimized.

The embodiments of the invention have been described above. As described referring to FIGS. 6, 7, and 10, the invention can be treated as an image forming apparatus control method. Moreover, the scope of the invention is not limited to that described above and thus various modifications can be made within a range not departing from the spirits of the invention.

What is claimed is:

1. An image forming apparatus comprising:

a paper feed part supplying paper used for printing;

a conveying path conveying the paper supplied from the paper feed part;

a transfer part transferring an image onto the paper;

a conveyance roller pair provided on the conveying path downstream of the paper feed part in a paper conveyance direction;

a registration roller provided on the conveying path upstream of the transfer part and downstream of the conveyance roller pair in the paper conveyance direction, the registration roller temporarily stopping paper on a leading end side thereof so that the paper bends while continuing to be conveyed at a back end side thereof, the registration roller timely delivering the paper to the transfer part in a manner such that the transfer of the image onto the paper is performed without any image displacement from a transfer start position on the paper;

a paper detector provided upstream of the registration roller in the paper conveyance direction, the paper detector detecting arrival of the paper at the registration roller;

an image forming part forming on an image carrier the image to be transferred onto the paper at the transfer part, the image forming part starting image formation before the detection of paper arrival by the paper detector;

an image processing part transmitting to the image forming part image data used for the image formation;

a control part, the control part controlling operation of the apparatus to control the printing, recognizing, based on output of the paper detector, that the paper has arrived at the paper detector and the registration roller, controlling transfer of the image onto the paper, stopping image formation at the image forming part and image data transmission at the image processing part, when, at a check time point before a tip of the image arrives at a position in the transfer part where a toner image is transferred onto the paper after the start of the image formation, paper arrival at the paper detector and the registration roller has not been detected, based on the output of the paper detector, and, restarting image formation at the image forming part and image data transmission at the image processing part without disposing of the formed image after the detection of paper arrival by the paper detector, and an input part connected to the part and making printing settings, wherein the input part, before the printing, input of selection of whether or not to accept stopping of image formation and image data transmission, and wherein the control part, only when stopping of image formation and image data transmission has been accepted, performs control of stopping image formation and image data transmission.

2. The image forming apparatus according to claim 1, wherein the image forming part includes a plurality of image forming units for forming a color image, wherein the image forming units are arranged relative to the transfer part so that one of the units is closest to the transfer part, and wherein the check time point corresponds to any time point in a period during which the tip of the image lies between the one of the image forming units closest to the transfer part and where the transfer part transfers the toner image onto the paper.

3. The image forming apparatus according to claim 1, further comprising a storage part storing a page on which the image formation speed and the image data transmission speed have been delayed during a job and image data of the page, wherein the input part accepts input for the page on which the image formation speed and the image data transmission speed have been delayed, and wherein the control part, only in a case Where input of a request for performing reprinting has been made at the input part, causes reprinting to be performed for the page on which the image formation speed and the image data transmission speed have been delayed.

4. An image forming control method for an image forming apparatus that comprises:

a paper feed part supplying paper used for printing;

a conveying path conveying the paper supplied from the paper feed part;

a transfer part transferring an image onto the paper;

a conveyance roller pair provided on the conveying path downstream of the paper feed part in a paper conveyance direction;

a registration roller provided on the conveying path upstream of the transfer part and downstream of the conveyance roller pair in the conveyance direction, the registration roller temporarily stopping the paper on a leading end side thereof so that the paper bends while continuing to be conveyed at a back end side thereof, the registration roller timely delivering the paper to the transfer part in a manner such that the transfer of the image on the paper is performed without any image displacement from a transfer start position of the paper;

a paper detector provided upstream of the registration roller in the paper conveyance direction, the paper detector detecting arrival of the paper at the registration roller;

an image forming part forming on an image carrier the image to be transferred onto the paper at the transfer part, the image forming part starting image formation before the detection of paper arrival by the paper detector;

an image processing part transmitting to the image forming part image data used for the image formation;

a control part controlling operation of the image forming apparatus to control the printing; and an input part connected to the control part and making printing settings, the image forming control method comprising steps of:

by the control part, recognizing, based on output of the paper detector, that the paper has arrived at the paper detector and the registration roller, and causing the transfer part to transfer the image formed by the image forming part to the paper; and in a case where the paper detector has not detected paper arrival at a check time point before a tip of the image arrives at a position in the transfer part where a toner image is transferred onto the paper after the start of the image formation, by the control part, stopping image formation at the image forming part and image data transmission at the image processing part, and after the detection of paper arrival by the paper detector, by the control part, restarting image formation at the image forming part and image data transmission at the image processing part, wherein die input part, before the printing, accepts input selection of whether of not to accept stopping of image formation and image data transmission; and wherein the control part, only when stopping of image formation and image data transmission has been accepted, performs control of stopping image formation and image data transmission.

5. The image forming apparatus control method according to claim 4, wherein the image forming part includes a plurality of image forming units for forming a color image;

wherein the image forming units are arranged relative to the transfer part so that one of the units is closest to the transfer part, and, wherein the check time point corresponds to any time point in a period during which the tip of the image lies between the one of the image forming units closest to the transfer part and where the transfer part transfers the toner image onto the paper.

6. The image forming apparatus according to claim 4, wherein the image forming apparatus comprises a storage part storing a page on which the image formation speed and the image data transmission speed have been delayed during a job and image data of the page, the image forming apparatus control method further comprising steps of:

accepting by the input part input of a request for performing reprinting for the page on which the image formation speed and the image data transmission speed have been delayed; and only in a case where the input of the request for performing the reprinting has been made at the input part, causing by the control part performance of reprinting for the page on which the image formation speed and the image data transmission speed have been delayed.

* * * * *